(12) United States Patent
Guzelgunler

(10) Patent No.: US 12,522,319 B2
(45) Date of Patent: Jan. 13, 2026

(54) CHAINLESS ELECTRIC BICYCLE, CONTROL METHODS AND SYSTEMS THEREOF

(71) Applicant: Yilcan Guzelgunler, Troy, OH (US)

(72) Inventor: Yilcan Guzelgunler, Troy, OH (US)

(*) Notice: Subject to any disclaimer, the term of this patent is extended or adjusted under 35 U.S.C. 154(b) by 843 days.

(21) Appl. No.: 17/690,893

(22) Filed: Mar. 9, 2022

(65) Prior Publication Data
US 2022/0194520 A1   Jun. 23, 2022

(51) Int. Cl.
| | |
|---|---|
| *B62M 19/00* | (2006.01) |
| *B60L 7/18* | (2006.01) |
| *B62M 6/45* | (2010.01) |
| *H02K 7/14* | (2006.01) |
| *H02K 11/33* | (2016.01) |

(52) U.S. Cl.
CPC ............... *B62M 19/00* (2013.01); *B60L 7/18* (2013.01); *B62M 6/45* (2013.01); *H02K 7/14* (2013.01); *H02K 11/33* (2016.01); *B60L 2200/12* (2013.01); *H02K 2213/03* (2013.01)

(58) Field of Classification Search
CPC . B62M 6/45; B62M 6/40; B62M 6/90; H02K 11/33; B60L 7/18; B60L 2200/12
See application file for complete search history.

(56) References Cited

U.S. PATENT DOCUMENTS

| | | | | |
|---|---|---|---|---|
| 3,884,317 A | * | 5/1975 | Kinzel | B60L 15/20 180/230 |
| 8,997,910 B2 | * | 4/2015 | Kim | B62K 25/005 180/205.1 |
| 9,260,035 B2 | * | 2/2016 | Chun | B62M 6/45 |
| 9,346,515 B2 | * | 5/2016 | Previdi | B60L 50/20 |
| 2011/0266082 A1 | * | 11/2011 | Yang | B60L 50/20 180/206.5 |
| 2012/0202649 A1 | * | 8/2012 | Huber | B62M 6/90 482/2 |
| 2013/0093187 A1 | * | 4/2013 | Lim | B62M 6/45 290/50 |
| 2014/0080661 A1 | * | 3/2014 | Paick | B62M 6/55 477/3 |
| 2016/0362021 A1 | * | 12/2016 | Sveje | B60L 50/20 |

* cited by examiner

*Primary Examiner* — Valentin Neacsu
*Assistant Examiner* — Michael R Stabley

(57) ABSTRACT

The present invention discloses a chainless electrical bicycle, which is designed to eliminate any type of mechanical means to transfer torque and power from pedals to a traction wheel. The present invention employs a generator to transfer a pedal torque and power with the help of power electronics, control electronics, a battery and control methods to a motor that is used for traction, which is attached to the traction wheel. The generator power is supplemented with the battery power, wherein the battery is rechargeable. The main purpose of the present invention is to emulate a mechanical chain bicycle operation, eliminate shortcomings of a mechanical chain bicycle, and introduce convenience features, such as, but not limited to, continuously variable electronic gear, a gravity compensation, a static and dynamic torque assistance, a ride charge feature, and an electric brake system.

19 Claims, 14 Drawing Sheets

Th: Threshold - input positive or negative

D: Delta – a positive number identifying input difference between y=0 and y=1

CHAINLESS ELECTRIC BICYCLE, CONTROL METHODS AND SYSTEMS THEREOF

FIELD OF THE INVENTION

The present invention relates primarily to a chainless electric bicycle that emulates the experience of a mechanical chain bicycle operation with gears. More specifically, the present invention is an improvement to the mechanical chain bicycle and the electric chain bicycle by eliminating the chain, transferring the pedal power to the propelling wheel electrically and providing additional features.

BACKGROUND OF THE INVENTION

A mechanical chain bicycle and an electric chain bicycle use a chain to transfer torque and power from pedals to the rear wheel of the bicycle. The chain used in bicycles take space, have exposed oil and dirt, requires maintenance, and it breaks. In the mechanical bicycle, the required pedaling torque can be adjusted by a mechanical gear, however, the mechanical gear comes with a torque-speed trade of not completely ease and extend the range of the riding experience. In addition, mechanical gears have overlap and the transitions from one gear to another is not always smooth, easy and the gear ratio range is limited. The electric chain bicycle faces the same challenges as the mechanical bicycle due to the chain. It still requires the use of the mechanical gear. The electric chain bicycle provides torque assistance to reduce the pedaling effort required, however, it more often breaks the chain since exerted torque can be high in a short instant or it requires the use of a heavy-duty chain. The chain imposes limitations as to how the pedals, the seat, and the rear wheel is placed.

A prior art U.S. Pat. No. 8,915,324B2 to Paick has been disclosed that describes an electric bicycle which includes a direction sensor to sense a rotation direction of pedals, a pedal load controller to adjust a load applied to the pedals, and an electronic control unit to release the load applied to the pedals through the pedal load controller when the sensed rotation direction is a reverse direction.

However, this prior art lacks an active rectifier and a 3-phase AC voltage and torque/current control method to adjust the resistance torque (torque that is resisting to the pedaling action) applied to the generator based on a bicycle model in combination with a closed loop control that the Paick introduces.

It is highly desirable to invent a viable solution to overcome the abovementioned shortcomings. The present invention therefore, is disclosed which describes an elimination of the use of the chain or any other mechanical means to transfer torque and power from pedals to the propelling wheel. The present invention utilizes a generator coupled to the pedals, power electronics, control electronics, a battery, a motor mounted into the wheel, control methods to control and transfer torque and power from pedals to the wheel. Further, the present invention emulates the mechanical chain bicycle experience and provides convenience features with a fixed and a dynamic torque assistance to ease and extend the riding experience, an electronic gear shifting manual or automatic based on the traction speed. Furthermore, the present invention implements an electric brake system wherein the braking is accomplished by an actuator brake and the regenerative brake. Moreover, the present invention introduces detection features such as detecting rider presence, weight sensing, automatic power shutoff. The present invention brings electrical components and systems, control methods, electromechanical and mechanical components and systems in a way, which were not attained by any prior art.

BRIEF SUMMARY OF THE INVENTION

The present invention concerns improvements in and relating to a bicycle system or apparatus in order to address the needs which were not fulfilled by the conventional bicycle apparatuses. The present invention thereby discloses a chainless electric bicycle apparatus which eliminates a chain that connects a pair of pedals to a propelling or traction or rear wheel by means of electrically transferring torque and power from the pedals to the traction wheel with the help of a battery power. In order to accomplish this, the pedals are coupled mechanically to a generator. The present invention further discloses a motor that may be mounted into the rear wheel. Since the generator power alone is not sufficient to sustain the overall operating conditions of the chainless electric bicycle, the battery may be used as a power source. The battery also allows to reduce the torque and power required from a rider to propel the chainless electric bicycle. Further, the present invention discloses an active rectifier, an inverter, a battery with charge-discharge circuit connected with a DC bus to generate required pedal resistance to give the experience of riding the chain bicycle, to provide various different experiences to the rider, to meet the requirements of the operating components, and to coordinate the power flow in between the generator, the battery, the motor, and power electronics. Furthermore, AC voltage control methods that match the generator and the motor types and their phase numbers are used to precisely regulate a resistance torque to the generator and the traction torque to the motor to propel the wheel.

The present invention further discloses a pedal control unit that generates the resistance torque and a feedforward torque, a traction control unit that manipulates the feedforward torque to apply a traction torque to the motor, a brake control unit that generates a brake force and a brake torque based on the operating conditions, and the way these three control units interact to coordinate the operation of the chainless electric bicycle are novel features of the present invention.

The present invention discloses a plurality of additional features such as a torque assistance to ease the pedal torque required, a ride charge feature to charge the battery while riding the electric bicycle in addition to an outlet charge, continuously variable electronic gear manually adjustable or automatic based on the traction speed, and an electric braking system utilizing an actuator brake and a regenerative brake. The details will be elaborated in the following detailed description section of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention. This summary is not intended to identify key features or essential features of the claimed subject matter, nor is it intended to be used in any way that would limit the scope of the claimed subject matter.

BRIEF DESCRIPTION OF THE DRAWINGS

Other objects, advantages and novel features of the invention will become apparent from the following detailed description of the present embodiment when taken in conjunction with the accompanying drawings. These figures are not intended to limit the scope of the present invention but rather illustrate certain attributes thereof.

Figure 1:
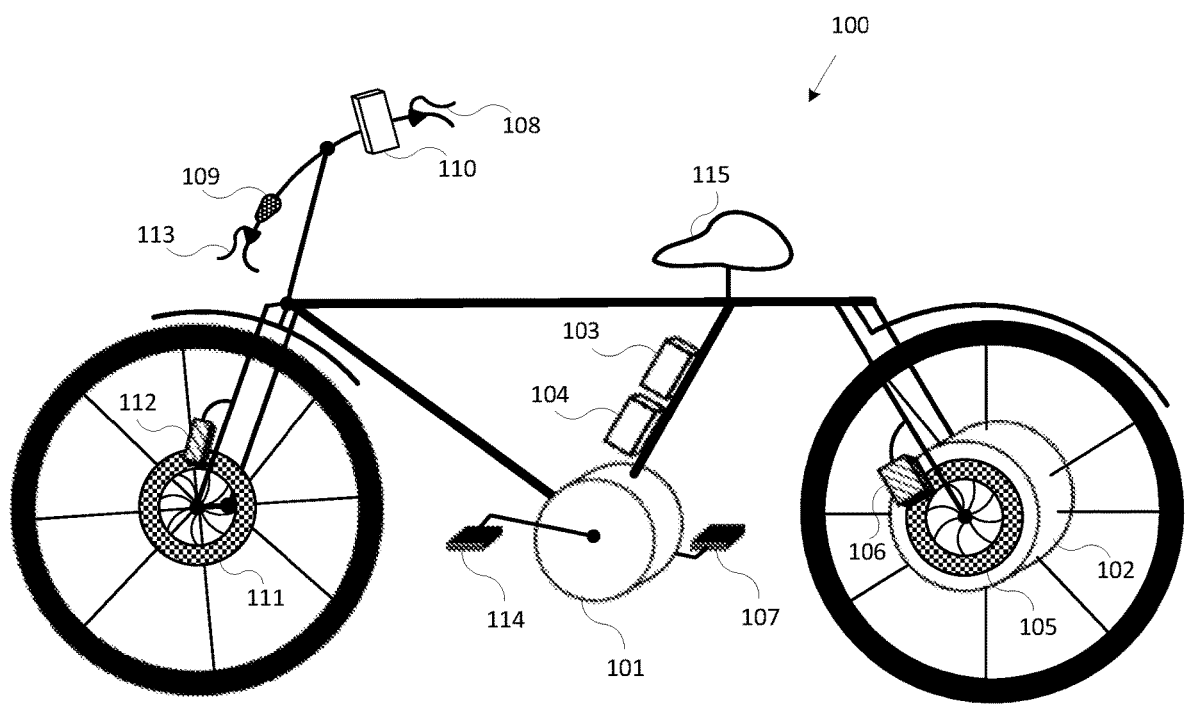
FIG. 1 illustrating an exemplary embodiment of a chainless electric bicycle with its components.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION OF THE INVENTION

As required, detailed embodiments of a chainless electric bicycle and control methods are disclosed herein; however, it is to be understood that the disclosed embodiments are merely exemplary of the chainless electric bicycle and the control methods, which can be embodied in various forms. Therefore, specific structural and functional details disclosed herein are not to be interpreted as limiting, but merely as a basis for the claims and as a representative basis for teaching one skilled in the art to variously employ the chainless electric bicycle and the control methods in virtually any appropriately detailed structure. Further, the terms and phrases used herein are not intended to be limiting; but rather, to provide an understandable description of the chainless electric bicycle and its control methods. While the specification concludes with claims defining the features of the chainless electric bicycle and control methods that are regarded as novel, it is believed that the chainless electric bicycle and control methods will be better understood from a consideration of the following description in conjunction with the drawing figures, in which like reference numerals are carried forward.

Before any embodiments of invention are explained in detail, it is to be understood that the invention is not limited in its applications to the details of construction and arrangement of components set forth in the following description or illustrated in the following drawings. The invention is capable of other embodiments and being practiced or of being carried out in various ways.

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

It is to be understood that the term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Headings of sections provided in the present application and the title of the present application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

As used herein the following terms have the meaning as provided. In the following descriptions, "propelling wheel", "traction wheel" are used interchangeably for a wheel into which a motor is mounted for traction. The traction speed means the motor speed. In other words, the propelling wheel speed is the motor speed. When the traction wheel speed is transformed to the equivalent pedal speed based on a gear ratio transfer equation [3], it is called the pedal referred traction speed. When the pedal speed is transformed to the traction equivalent speed based on the gear ratio transfer equation [3], it is called the traction referred pedal speed. When the pedal speed is equal to the pedal referred traction speed, or when the traction speed is equal to the traction referred pedal speed, it is called the pedal speed and the traction speed are synchronized. The phrases "generator resistance torque", "pedal resistance torque" and "resistance torque" are used interchangeably. The phrase "command" means the value the actual measured variables are regulated or controlled to.

An electric machine, which has a stationary part and a rotating part and it can convert an electric power to a mechanical power or a mechanical power to an electric power, can be an electric motor or a generator depending on the primary use. However, in the following descriptions, the phrases "generator" and "motor" are used to indicate the specific component and its primary function on the chainless electric bicycle. These phrases, "motor" and "generator", do not exclude the other operational case. For instance, the motor can operate as the generator such as during braking, which is also referred to as a regenerative braking. The phrases "machine" and "machines" are used to refer to the generator and the motor on the chainless electric bicycle. A generator assembly or a pedal assembly refers to all the components required to couple a pair of pedals mechanically to a generator rotor, wherein the generator assembly also includes all sensors and electronics coupled electrically and mechanically to the generator in close proximity.

In the following description, a unit will be used to describe a control method, a module will be used to describe a sub-control method under the unit, and a block will be used to describe a smaller functional module under the module or the unit. A chain bicycle will refer to only feet driven mechanical bicycle with chains. A pedal plant in the drawings and in the following descriptions refers to the model of the electromechanical system of the pedal assembly. The pedal plant includes, but not limited to the pedals, cranks, generator, position sensor, torque sensor and any mechanical components that are needed to couple them all together. A traction plant in the drawings and in the following descriptions refers to the model of the electromechanical system of the motor. The traction plant includes, but not limited to the motor, the wheel that is coupled to it, the bicycle weight with a rider, any other mechanical or electromechanical components that is interacting mechanically with the wheel and the motor, and the surface of the road the wheel is on, the road incline angle, and the wind. A gear ratio in the present invention refers to the electronic gear ratio that the present invention introduces. In the following, "startup" phrase refers to the bicycle starting from zero traction speed and zero pedal speed.

Reference will now be made in detail to embodiments of the present invention, examples of which are illustrated in the accompanying drawings.

Hardware Components

According to an embodiment of the present invention, a chainless electric bicycle 100 shown in FIG. 1 depicts various functional components of the present invention. It shall be noted that the present invention is not limited to two wheels. It can be applied to different types of pedal-powered multi-wheeled transportation vehicles such as, but not limited to a tandem bicycle, a tricycle and a quadricycle. Furthermore, the number of components and the arrangement of components are flexible and scalable. FIG. 1 depiction is one of the many possible configurations. For instance, a motor 102 can be placed in a front wheel or the motor 102 can also be in the front wheel in addition to a rear wheel increasing propelling power. In another example, when the present invention is applied to the tricycle wherein there are two wheels in rear, both the wheels can contain motors.

The chainless electric bicycle 100 comprises a pair of pedals 107, 114, which are mechanically coupled to a rotating part of a generator 101, wherein the rotating part can also be called a rotor. The generator 101 and the motor 102 can be any type of AC electric generator and motor with any phase number such as, but not limited to, an induction generator and motor, a switch reluctance generator and motor, a synchronous reluctance generator and motor, a brushless DC (BLDC) generator and motor, a permanent magnet (PM) generator and motor, an inside out (rotating part of the machine is outside of the stationary part of the machine) PM generator and motor, an axial (pancake) PM generator and motor. The axial PM generator and motor can be various configurations such as double sided or single sided windings.

Rotor position sensors for the generator 101 and the motor 102 are integrated into generator and the motor assemblies. They are used in control of the generator 101 and the motor 102. Instead of the position sensors, a position estimation method can be used to obtain the rotor position to control the generator 101 and the motor 102. Further, a rotor position information can come from a sensor such as, but not limited to, an encoder, a resolver, a hall-effect sensor, or a sensor similar in nature.

According to one embodiment of the present invention, the motor 102 is placed in the rear wheel, but it can also be placed in the front wheel or in both wheels as well.

The chainless electric bicycle 100 comprises power electronics, and control electronics 104, which are configured to manage all the control and the monitoring functionality of the chainless electric bicycle 100 and its components. The power electronics and the control electronics 104 can be split in variety of ways, which is not limited to the one location and assembly. In one embodiment, the power electronics such as an active rectifier 201 and an inverter 203 are placed in the same assembly as in their associated machine assemblies, wherein the control electronics 104 is placed remotely anywhere on the chainless electric bicycle 100. In another embodiment, the control electronics 104 can be split in three parts: an active rectifier control circuit, an inverter control circuit and a central control circuit. The power electronics and the associated control circuits can be placed in its associated machine assemblies. The central control circuit can be placed remotely anywhere on the chainless electric bicycle 100. The central control circuit can be further broken up to multiple functional parts and placed in different parts of the chainless electric bicycle 100.

The chainless electric bicycle 100 comprises a battery 103, which is depicted near the power electronics and the control electronics 104. The battery 103 includes a charge-discharge control circuit.

The chainless electric bicycle 100 comprises a user interface 110, which is adapted to communicate with the control electronics 104 and to allow to display, monitor, measure, estimate, calculate, control and configure various functionalities of the chainless electronic bicycle 100. The user interface 110 can be selected from, but not limited to, a display with touch screen, a display with buttons and knobs, a display with touch screen and buttons and knobs.

The chainless electric bicycle 100 comprises an electronic gear shift knob 109, which is adapted to set the resistance level of the pedals 107, 114. The electronic gear shift can be set to automatic mode via a button on the electronic gear shift knob 109 or via the user interface 110 which will change the gear ratio in a continuously variable fashion as the speed changes. The automatic gear shifting input when activated changes the gear based on the pedal speed, wherein if the generator 101 or any circuit that is operating the generator 101 fails, the chainless electric bicycle 100 can run in a limp mode, wherein in the limp mode the manual electronic gear shift interface such as the knob 109 is used as a throttle to generate the feedforward torque to the motor 102. The electronic gear shift knob 109 is only one of the many interface options that can be selected from, but not limited to, a dial, buttons, and a touch screen interface.

According to one embodiment of the present invention, the chainless electric bicycle 100 comprises two brake systems: a mechanical brake system and an electric brake system. The mechanical brake system is on the front wheel and the electric brake system is on the rear wheel. The mechanical brake system is illustrated with a mechanical brake handle 113, a caliper 112, and a brake disc 111 as shown in FIG. 1. The electric brake system is initiated by an electric brake handle 108. The electric brake system comprises an actuator brake 106, an actuator brake disc 105, and a motor regenerative brake. Depending on the operating status, the motor regenerative brake alone, the actuator brake 106 alone or both the motor regenerative brake and the actuator brake 106 are used when the electric brake system is initiated by the electric brake handle 108. When both the actuator brake 106 and the regenerative braking methods are used, an electric brake handle signal is partitioned dynamically in between the two depending on the operating status, which is explained in more detail in later text below. The actuator brake 106 can be different types of brakes than a disc brake. Examples for the different types of brakes are drum brake and any type of rim brake such as caliper brake, cantilever brake, V-brake. It is to be noted in other embodiments of the present invention, it is possible to have the mechanical brake system alone, the electric brake system alone, or both, the electric and the mechanical brake system on the chainless electric bicycle 100.

The present invention has a main power button, which is used to connect and disconnect the battery power to the most or all of the power electronics and the control electronics 104 on the chainless electric bicycle 100, hence pressing on the main power button turns on and off the main power to the chainless electric bicycle 100. The main power button can be on the control electronics 104, on a handlebar, on the gear shift knob 109, on the user interface 110 or anywhere else on the chainless electric bicycle 100. The main power button can be selected from, but not limited to, a push button, a toggle button, a switch, a dial, a touch screen interface.

In one embodiment, a vibration sensor integrated into the control electronics 104 allows the control electronics 104 to detect presence or absence of the rider on or near the chainless electric bicycle 100 by measuring and monitoring a displacement of the chainless electric bicycle 100. If the main power is turned on, the vibration sensor can be used to put at least a part of the electronics to a sleep state to preserve battery power if the control electronics 104 detects no rider presence continuously by the end of a first time delay. The vibration sensor is also used to turn off the main power if the control electronics 104 detects no rider presence continuously by the end of a longer time delay than the first time delay. Once the main power is turned off, the rider is required to press the main power button to turn on the main power to the chainless electric bicycle 100. If the main power is turned off by the vibration sensor and the main power button is on a physical "On" position due to the nature of the power button used, the power button is switched to "Off" position and then "On" position to turn on the main power back to the bicycle electronics. The vibration sensor is selected from, but not limited to, an accelerometer, a spring loaded vibration sensor, a piezoelectric vibration sensor, a mechanical tilt sensor.

In another embodiment, touch sensors are placed on the handlebars. The touch sensors allow to detect presence or non-presence of the rider on or near the bicycle. When the main power button is turned on, if the touch sensors do not detect the rider continuously by the end of the first time delay, the control electronics 104 puts at least a part of the electronics into the sleep state. The touch sensors are also used to turn off the main power of the chainless electric bicycle 100 if they do not detect the rider presence continuously by the end of the longer time delay than the first time delay. The touch sensor is selected from, but not limited to, a capacitive touch sensor, a pressure touch sensor, a tactile touch sensor.

A seat 115 of the chainless electric bicycle 100 is shown in FIG. 1, that includes a weight sensor underneath, which allows to measure the weight of the rider and as a result to calculate more accurately traction plant model parameters such as an inertia of the chainless electric bicycle 100, a rolling resistance coefficient, a gravity torque coefficient, a drag torque coefficient and other bicycle model related parameters. The weight sensor is selected from, but not limited to, a loadcell sensor, a discrete weight switch, which signals a range of weight.

Power Circuits

Figure 2:
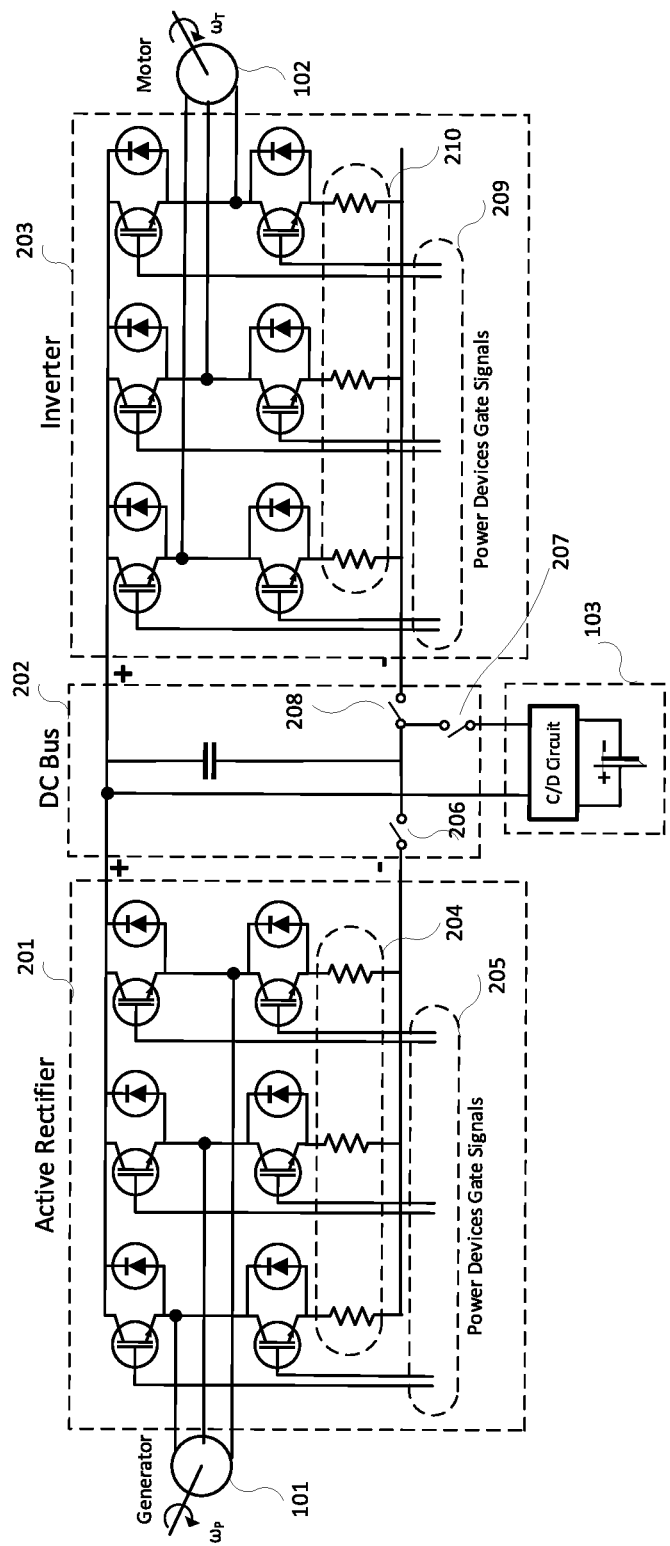
FIG. 2 illustrating power components and power electronics used herein, describing the details of its parts and how all are connected, according to an embodiment of the present invention.

According to the embodiment of the present invention, the power electronics that can be used with the present invention are depicted in FIG. 2. In FIG. 2, the 3-phase active rectifier 201 is connected to a DC bus 202 and the generator 101. The active rectifier 201 is used to apply a 3-phase AC voltage to the generator 101 to control the 3-phase AC generator current, hence the generator resistance torque and as a result the power flow to the DC bus 202. The 3-phase inverter 203 is connected to the DC bus 202 and the motor 102. The inverter 203 is used to apply a 3-phase AC voltage to the motor 102 to control the torque, the 3-phase AC current and the speed of the motor 102, hence the power flow in between the motor 102 and the DC bus 202. The battery 103 with the charge-discharge circuit is connected to the DC bus 202 to provide power to the DC bus 202 and receive power for charging. Power devices with anti-parallel diodes are used as switches in the active rectifier 201 and the inverter 203, which are selected from various devices such as, but not limited to MOSFET (metal oxide semiconductor field effect transistor), IGBT (insulated gate bipolar transistor), GaN (Gallium Nitride), or any other power switch that does the same function or combined function with the anti-parallel diode attached to it. Gate connections/signals 205 and 209 control the power devices for generating and applying a specific AC voltage at a specific magnitude and frequency for both the active rectifier 201 and the inverter 203. Current sense resistors (also called current sensors) 204 and 210 are used to measure the 3-phase AC current of the generator 101 and the motor 102.

The DC bus 202 includes three DC power switches 206, 207, 208, which can be used in different combinations in different embodiments. The switches 206, 207, 208 can be relays or solid-state devices and it can be placed on the positive bus wire or negative bus wire or on both DC bus wires as pairs such as in a double-pole single-throw (DPST) relay. The function of the switches 206, 207, 208 is to isolate one power section of the power electronics from the rest of the power electronics, both for power down and safety and fault tolerant operation. The switch 206 is placed in between the active rectifier 201 and the battery 103, the switch 207 is placed in between the inverter 203 and the battery 103, and the switch 208 is placed in between the battery 103 and the rest of the DC bus 202 to disconnect and connect the battery power from and to the rest of the power electronics.

Control Method

Before describing the control method of the chainless electric bicycle 100, it is to be understood that the description below and the figures it refers to is only one exemplary way among many ways of explaining, arranging and implementing the present invention and it is solely intended to demonstrate the present invention in a clear and concise way. It is to be understood that the control method is software and as such the descriptions and the symbols used in the drawings are only to demonstrate the functions of the control method and not to be seen as hardware electronic components, limitations and only one way to implement. The present invention is highly configurable to change its functioning and the riding experience.

Figure 3:
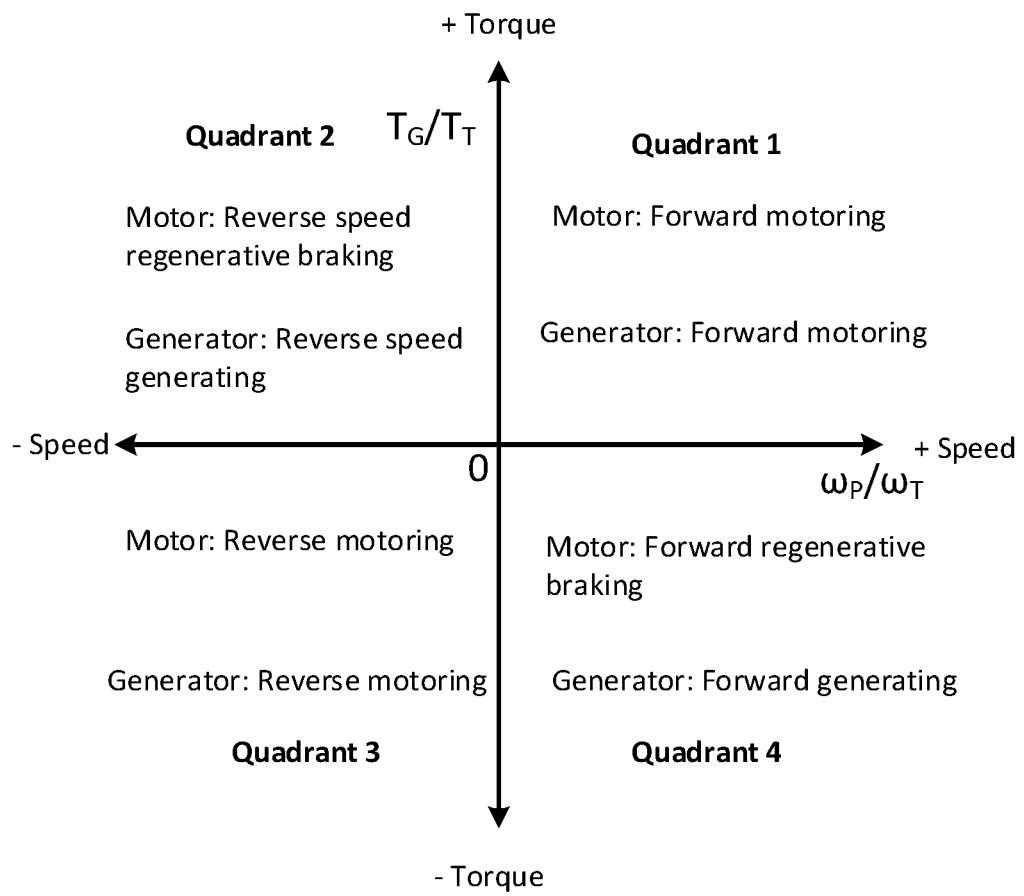
FIG. 3 depicting torque-speed quadrants of the operations of a generator and a motor, according to an embodiment of the present invention.

Any electric machine whether it is operating as a generator or as a motor has 4 quadrants of operation in terms of torque and speed, which is depicted in FIG. 3. According to the embodiment of the present invention, torque axis in FIG. 3 is the traction torque $T_T$ and the generator resistance torque $T_G$, and speed axis is the pedal speed $\omega_P$ and the traction speed $\omega_T$. The convention of signs of torques and speeds are selected and used in the explanation of the present invention as in the following description. A bicycle forward motion is a positive speed, hence the traction torque and the traction speed are positive that are causing the forward motion. The forward motion is caused by the positive pedal torque $T_P$ and the positive pedal speed $\omega_P$ similar to the chain bicycle pedaling that propels the bicycle forward. The resistance torque $T_G$ (pedal resistance torque) has to be the opposite sign of the pedal torque in the forward pedaling, hence the applied resistance torque to the generator 101 is negative. However, for the simplicity, the resistance torque calculation in a pedal control unit and in its modules is positive. The resistance torque generation in the pedal control unit described below applies the correct sign of the resistance torque in the last stage, which is a generator torque controller 503 in FIG. 5. In the control diagram of FIG. 6A, the sign reversal has shown as the subtraction from the pedal torque in a summation block 605 going into a pedal plant 606. The generator torque controller 503 in FIG. 5 is a part of the pedal plant 606 in FIG. 6A since the electromagnetic torque generation time constant is much smaller than the mechanical system time constant.

Figure 4:
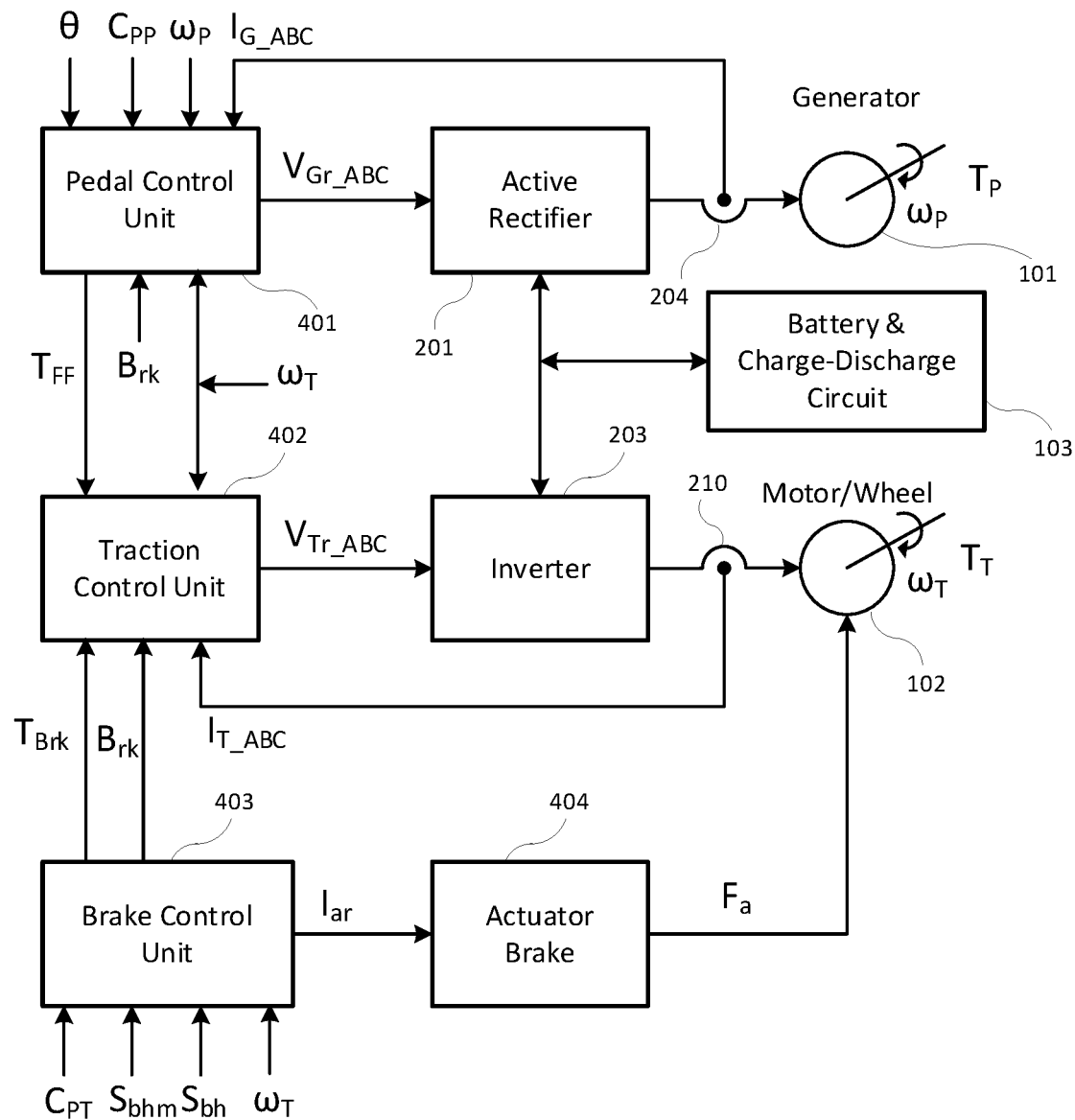
FIG. 4 illustrating control units and their connections to other components, according to an embodiment of the present invention.

According to the embodiment of the present invention, the control method is made up of three control units shown in FIG. 4 i.e. the pedal control unit 401, a traction control unit 402, and a brake control unit 403. The pedal control unit 401 describes the way the generator resistance torque and the traction speed are controlled, and the traction control unit 402 describes the way the traction torque and traction speed (motor torque and speed) are controlled. It is to be noted that the pedal speed is not controlled by the pedal control unit 401. It is simply the response to the pedal torque and the resistance torque. The pedal speed is used as a command to control the traction speed. The control units are software units that are programmed into the control electronics 104. FIG. 4 shows the control units and their high level associations within themselves and with the rest of the system. The pedal speed and the traction speed are calculated from their associated machine position sensors. Current sensors are utilized to measure each machine's currents and to control each machine's torque. Variety of current sensors, current measurement methods, current measurement locations can be used to measure the phase currents such as, but not limited to, hall effect current sensors on phases, chip sensors on the phases or on the DC bus 202, and current sense resistors 204, 210 that are placed in between the bottom legs and the negative DC bus of the active rectifier 201 and the inverter 203 as shown in FIG. 2.

Figure 5:
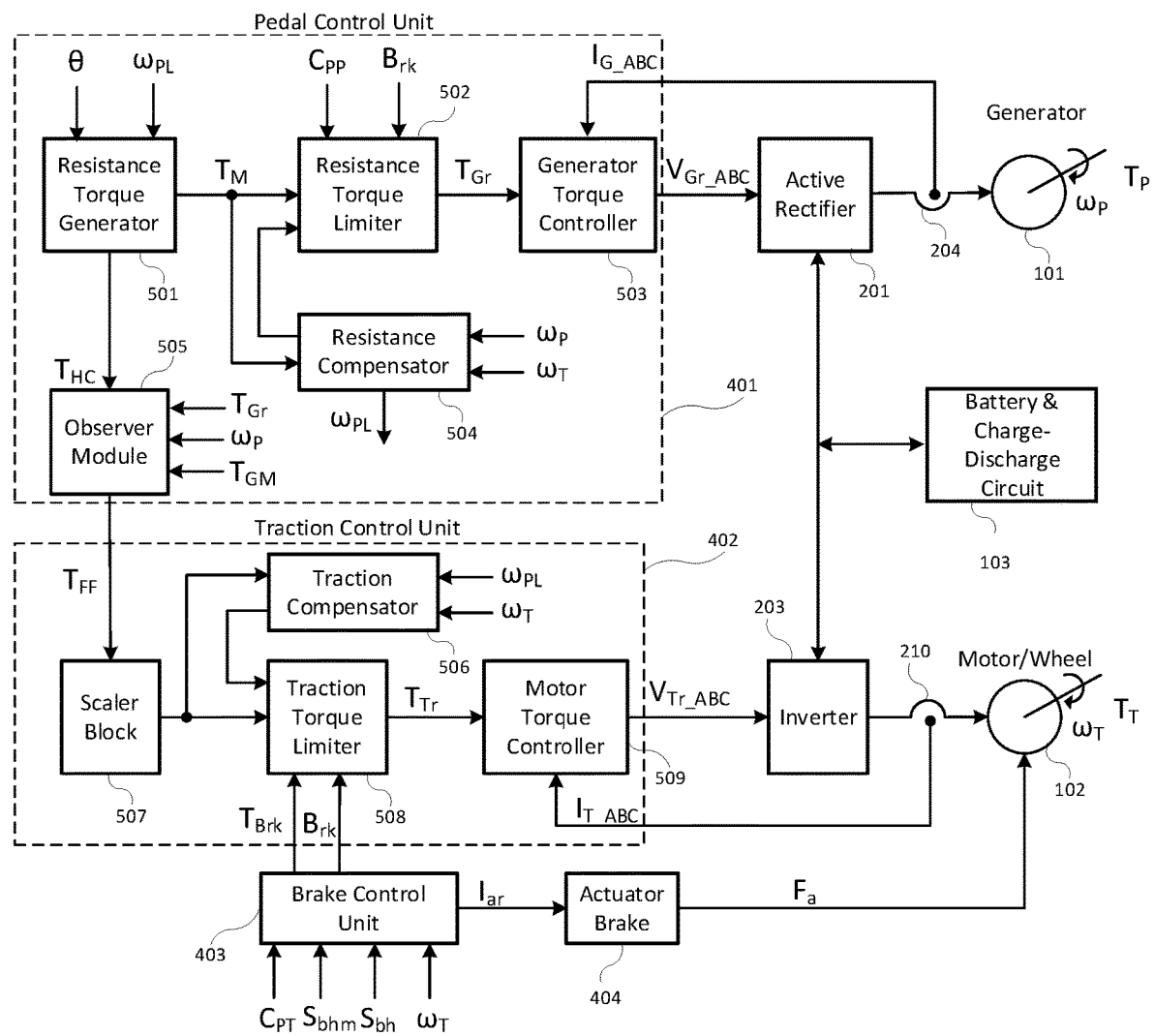
FIG. 5 demonstrating what makes up control units, how control modules are connected and interacting with each other and the rest of the system, according to an embodiment of the present invention.

According to the embodiment of the present invention, FIG. 5 describes about the modules of the control units in more detail. The pedal control unit 401, consists of a resistance torque generator 501, which generates a part of the pedal resistance torque command called the model resistance torque $T_M$. The resistance torque generator 501 uses a bicycle model to calculate the model resistance torque based on the pedal speed and the incline angle.

In FIG. 5, a resistance compensator 504 is a closed loop speed controller, which receives the pedal speed and the traction speed, and the model resistance torque to calculate an additional resistance compensation torque. The resistance compensator torque and the model resistance torque are fed into a resistance torque limiter module 502 to calculate the resistance torque command $T_{Gr}$. The resistance torque limiter module 502 implements a collection of constraints on the resistance torque, hence on the resistance torque command, which will be obvious below.

The resistance torque command is fed into the generator torque controller 503 in FIG. 5 to generate a 3-phase AC voltage command $V_{Gr\_ABC}$ ($V_{Gr\_ABC}$ indicating phase A voltage, phase B voltage and phase C voltage) to the active rectifier 201. Since it is the resistance torque that is applied to the generator 101 and the forward pedal speed is positive, the resistance torque command is negated in the generator torque controller 503 before it is controlled. Typically, the generator torque controller 503 is a rotor field-oriented control method for a 3-phase AC generator. The field-oriented control method receives the 3-phase AC current measurement $I_{G\_ABC}$ ($I_{G\_ABC}$ indicating phase A current, phase B current and phase C current for the generator) from the current sense resistors 204 and regulates it to the 3-phase AC current magnitude, phase and frequency that matches the resistance torque command. The field-oriented control method utilizes the rotor position information to transform the 3-phase AC current $I_{G\_ABC}$ to a 2-phase dq rotor reference frame. Depending on the generator type used, the d-axis and the q-axis current commands are calculated to control the resistance torque. Current controllers such as PI (proportional, Integral) are utilized for both d-axis and q-axis current regulation. The generator torque controller 503 produces the d-axis and the q-axis voltage commands for the active rectifier 201. By using the rotor position, the d-axis and the q-axis voltage commands are transformed to the 3-phase active rectifier AC voltage command $V_{Gr\_ABC}$. By utilizing a voltage modulation technique such as one of the space vector modulation (SVM) techniques, the active rectifier AC voltage command is converted to the gate signals 205 for the power devices of the active rectifier 201 to generate the AC voltage on its AC terminals, hence the resistance torque. The type of a control method used can vary depending on the generator type used.

The purpose of an observer module 505 is to estimate the pedal torque that is applied by the rider in order to calculate the feedforward torque $T_{FF}$ to the traction control unit 402. The estimated pedal torque is based on the resistance torque command and the pedal speed. The gravity compensator torque also is fed into the observer module 505 to use in the calculation of the feedforward torque.

The traction control unit 402 is a feedforward control with an option of a closed loop controller. The function of the traction control unit 402 is to process the received feedforward torque and if configured, add the traction compensation torque, which is generated by the closed loop traction controller.

A scaler block 507 is used to convert the feedforward torque to a usable value based on the gear ratio, which shall be referred as a first traction torque. The scaler block 507 also includes a gain, which is called the traction torque assist gain or torque assist gain, when adjusted, it can either add torque to the existing traction torque, or it can reduce the traction torque to charge the battery 103 while the rider is pedaling. Alternative to the traction torque assist gain, a traction torque compensator (traction compensator) 506 with a closed loop controller when enabled can adjust the torque assistance dynamically based on the pedal and traction speeds and the first traction torque.

Both the first traction torque and the traction compensation torque are received by a traction torque limiter 508. The traction torque limiter 508 implements a collection of constraints on the traction torque, hence the traction torque command, which are detailed below.

A motor torque controller 509 in FIG. 5 receives the traction torque command and based on the measured 3-phase AC motor current $I_{T\_ABC}$ ($I_{T\_ABC}$ indicating phase A current, phase B current and phase C current), it computes an inverter 3-phase AC voltage command $V_{Tr\_ABC}$ ($V_{Tr\_ABC}$ indicating phase A voltage, phase B voltage and phase C voltage), to control the traction torque and the speed. Typically, the motor torque controller 509 is a rotor field-oriented control method for a 3-phase AC motor. The field-oriented control method receives the 3-phase AC motor current measurement from the current sense resistors 210 and regulates them to the 3-phase AC current magnitude, phase and frequency that matches the traction torque command. The field-oriented control method utilizes the rotor position information to transform the 3-phase AC current $I_{T\_ABC}$ to a 2-phase dq rotor reference frame. Depending on the motor type used, the d-axis and the q-axis current commands are calculated to control the traction torque. Typically, current controllers such as PI (proportional, Integral) are utilized for both d-axis and q-axis current regulation. The motor torque controller 509 produces the d-axis and the q-axis voltage commands for the inverter 203. By using the rotor position, the d-axis and the q-axis voltage commands are transformed to the inverter AC voltage command. By utilizing a voltage modulation technique such as one of the space vector modulation techniques, the inverter AC voltage command is converted to the gate signals 209 for the power devices of the inverter 203 to generate the AC voltage command, hence the traction torque. The type of the control method used can vary depending on the motor type used. It shall be noted that the 3-phase AC current measurements for the generator 101 and for the motor 102 can be obtained from a 2-phase (for example phase A and phase B) current measurements, wherein the third phase is a derived value from the 2-phase measurements.

Chain Bicycle Equations

Before discussing the details of the control modules, chain bicycle motion governing equations and model is to be discussed along with how it is applicable to the chainless electric bicycle 100. These equations are utilized in the control methods of the present invention.

Since the power loss in the chain is very small, the power loss has been ignored in the following equations. In the following equations, the chain always has tension and only moving forward bicycle state has been analyzed, hence, the pedal speed $\omega_P$, and the traction speed $\omega_T$ are positive. The pedal without the chain that couples it to the traction wheel has insignificantly small inertia, and resistance (friction). Thus, the mechanical pedal parameters have been neglected.

Starting with an assumption that, the pedal power is equal to the traction power as given below:

$$P_P = P_T \qquad [1]$$

Wherein, $P_P$ is the mechanical power applied to the pedals, $P_T$ is the mechanical power delivered to the propelling wheel.

Torque and speed relationship between the pedals and the traction wheel in the chain bicycle are:

$$T_P \omega_P = T_T \omega_T \qquad [2]$$

Wherein, $T_P$ is the pedal torque, $T_T$ is the traction torque that is applied to the propelling wheel. By including the gear ratio, the following relationship is obtained:

$$\omega_P = \frac{\omega_T}{G_R} \qquad [3]$$

$$T_P = G_R T_T \qquad [4]$$

Wherein, $G_R$ is the gear ratio.

A traction plant model equation can be written as follows:

$$T_T = J_B \frac{d\omega_T}{dt} + T_{TR} \qquad [5]$$

Wherein, $J_B$ is the equivalent rotational bicycle inertia, $T_{TR}$ is the traction resistance torque.

If both sides of the equation [5] multiplied by the gear ratio $G_R$, the traction plant model equation is converted to the pedal model equivalent as shown below:

$$T_P = G_R T_T = G_R J_B \frac{d\omega_T}{dt} + G_R T_{TR} \qquad [6]$$

The components of the traction resistance torque are as follows:

$$T_{TR} = T_H + T_R + T_D + T_S + T_C \qquad [7]$$

Wherein, $T_H$ is the traction gravity resistance torque, which is solely caused by the inclination of the chain bicycle due to the gravity acting on it. $T_R$ is the traction rolling resistance torque, which is also referred to as a viscous friction torque and is caused by the rolling effect of the wheel on the road and the rolling effect of other rotating parts. $T_D$ is the traction drag resistance torque, which is the effect of the wind resistance on the chain bicycle and the rider. $T_S$ is the traction stiction torque, which is a characteristic that is experienced when two surfaces are in contact and a motion starts from stand still. It is a transitory torque that disappears with increased speed. $T_C$ is the traction coulomb resistance torque, which is constant at any speed. The details of these traction resistance torque components are provided in the following equations:

$$T_H = K_H \sin\theta \qquad [8]$$

$$T_R = B_B \, \omega_T \cos\theta \qquad [9]$$

$$T_D = K_D \, \omega_T^2 \qquad [10]$$

$$T_S = K_{ST} \, e^{\frac{-\omega_T}{\sigma_T}} \qquad [11]$$

$$T_C = K_{CT} \qquad [12]$$

Wherein, $K_H$ is the traction gravity torque coefficient, $\theta$ is the incline angle of the chain bicycle, $B_B$ is the traction rolling torque coefficient or the viscous friction coefficient, $K_D$ is the traction drag torque coefficient, $K_{ST}$ is the traction stiction torque coefficient, $\sigma_T$ is the traction stiction torque decay coefficient, and $K_{CT}$ is the traction coulomb resistance torque. The expanded traction resistance torque equation is as follows:

$$T_{TR} = K_H \sin\theta + B_B \, \omega_T \cos\theta + K_D \, \omega_T^2 + K_{ST} \, e^{\frac{-\omega_T}{\sigma_T}} + K_{CT} \qquad [13]$$

Equation [13] further converted to the pedal equivalent resistance torque by replacing the traction speed with the pedal equivalent speed based on equation [3].

$$T_{PR} = G_R T_{TR} = G_R \, K_H \sin\theta + G_R^2 \, B_B \, \omega_P \cos\theta + \qquad [14]$$
$$G_R^3 \, K_D \, \omega_P^2 + G_R \, K_{ST} \, e^{\frac{-G_R \omega_P}{\sigma_T}} + G_R \, K_{CT}$$

Wherein $T_{PR}$ is the pedal resistance torque. Since the chain bicycle pedal parameters have been neglected, the simplified chain bicycle pedal torque equation [6] with the pedal equivalent speed based on equation [3] can be written as follows:

$$T_P = G_R^2 \, J_B \, \frac{d\omega_P}{dt} + T_{PR} \qquad [15]$$

The expanded form of Equation [15] is given as follows:

$$T_P = G_R^2 \, J_B \, \frac{d\omega_P}{dt} + G_R^2 \, B_B \, \omega_P \cos\theta + \qquad [16]$$
$$G_R \, K_H \sin\theta + G_R^3 \, K_D \, \omega_P^2 + G_R \, K_{ST} \, e^{\frac{-G_R \omega_P}{\sigma_T}} + G_R K_{CT}$$

Equation [16] represents the complete pedal model of the chain bicycle.

Chainless Electric Bicycle Equations

In above mentioned disclosure, it is demonstrated that how the traction torque dynamics is experienced on the pedals of the chain bicycle. In the following, various chain bicycle equations have been applied to the chainless electric bicycle 100 to drive a resistance torque model.

The chainless electric bicycle 100 is mechanically disconnected from the propelling wheel and has two separate machines with two inherent dynamics, one being the motor 102 and the other being the generator 101. It has been demonstrated above how pedal resistance torque equations are governed by the traction torque equations in the chain bicycle. One of the aims of the present invention is to emulate the pedal coupling to the traction wheel on the generator 101 on the chainless electric bicycle 100 similar to the chain bicycle pedal coupling to the traction wheel. This means, the present invention emulates the resistance similar to the chain bicycle on the generator 101. However, the generator 101 has its own mechanical characteristic independent of the traction wheel, which can be written as below:

$$T_P = J_P \frac{d\omega_P}{dt} + T_{PGR} \qquad [17]$$

Wherein, $J_P$ is the inertia of the pedal assembly, $T_{PGR}$ is the generator mechanical resistance torque.

The generator mechanical resistance torque practically has no gravity resistance torque and the drag resistance torque. As a result, the generator mechanical equation becomes:

$$T_P = J_P \frac{d\omega_P}{dt} + B_P \, \omega_P + K_{SP} \, e^{\frac{-\omega_P}{\sigma_P}} + K_{CP} \qquad [18]$$

Wherein, $B_P$ is the pedal assembly rolling torque coefficient, $K_{SP}$ is the pedal assembly stiction torque coefficient, $\sigma_P$ is the pedal assembly stiction torque decay coefficient, $K_{CP}$ is the pedal assembly coulomb resistance torque. For equation [18] to represent as the complete model, hence to become the electromechanical model of the generator assembly, the electromagnetic torque $T_M$ produced by the generator 101 is added to equation [18] as shown below:

$$T_P = J_P \frac{d\omega_P}{dt} + B_P \omega_P + K_{SP} \, e^{\frac{-\omega_P}{\sigma_P}} + K_{CP} + T_M \qquad [19]$$

Equation [19] now represents the complete electromechanical pedal system (pedal plant 606) of the chainless electric bicycle 100. Because the present invention emulates equation [16], and the response to the pedal torque the rider exerts should be the same in the chainless electric bicycle 100 as in the chain bicycle. Therefore, if equation [16] is equated to equation [19] and solved for the electromagnetic torque $T_M$, the result, as shown below, is the model that is needed to match the chain bicycle.

$$T_M = (G_R^2 J_B - J_P)\frac{d\omega_P}{dt} + (G_R^2 B_B \cos\theta - B_P)\omega_P + G_R^3 K_D \omega_P^2 + \qquad [20]$$
$$G_R K_{ST} e^{\frac{-G_R \omega_P}{\sigma_T}} - K_{SP} e^{\frac{-\omega_P}{\sigma_P}} + G_R K_H \sin\theta + G_R K_C - K_{CP}$$

The components of the pedal electromagnetic torque in the chainless electric bicycle 100 are:

$$T_M = T_J + T_R + T_D + T_{HP} + T_{SP} + T_{CP} \qquad [21]$$

$$T_J = (G_R^2 J_B - J_P)\frac{d\omega_P}{dt} \qquad [22]$$

$$T_{RP} = (G_R^2 B_B \cos\theta - B_P)\omega_P \qquad [23]$$

$$T_{DP} = G_R^3 K_D \omega_P^2 \qquad [24]$$

$$T_{HP} = G_R K_H \sin\theta \qquad [25]$$

$$T_{SP} = G_R K_{ST} e^{\frac{-G_R \omega_P}{\sigma_T}} - K_{SP} e^{\frac{-\omega_P}{\sigma_P}} \qquad [26]$$

$$T_{CP} = G_R K_{CT} - K_{CP} \qquad [27]$$

Wherein, $T_J$ is the inertia resistance torque, $T_{HP}$ is the gravity resistance torque, which is solely caused by the inclination of the chainless electric bicycle 100 due to the gravity acting on it. $T_{RP}$ is the rolling resistance torque, which is also referred to as a viscous friction torque and is caused by the rolling effect of the wheel on the road and the rolling effect of other rotating parts. $T_{DP}$ is the drag resistance torque, which is the effect of the wind resistance. $T_{SP}$ is the stiction resistance torque, which is a characteristic that is experienced when two surfaces are in contact and a motion starts from stand still. It is a transitory torque that disappears with increased speed. $T_{CP}$ is the coulomb resistance torque, which is constant at any speed.

Figure 7:
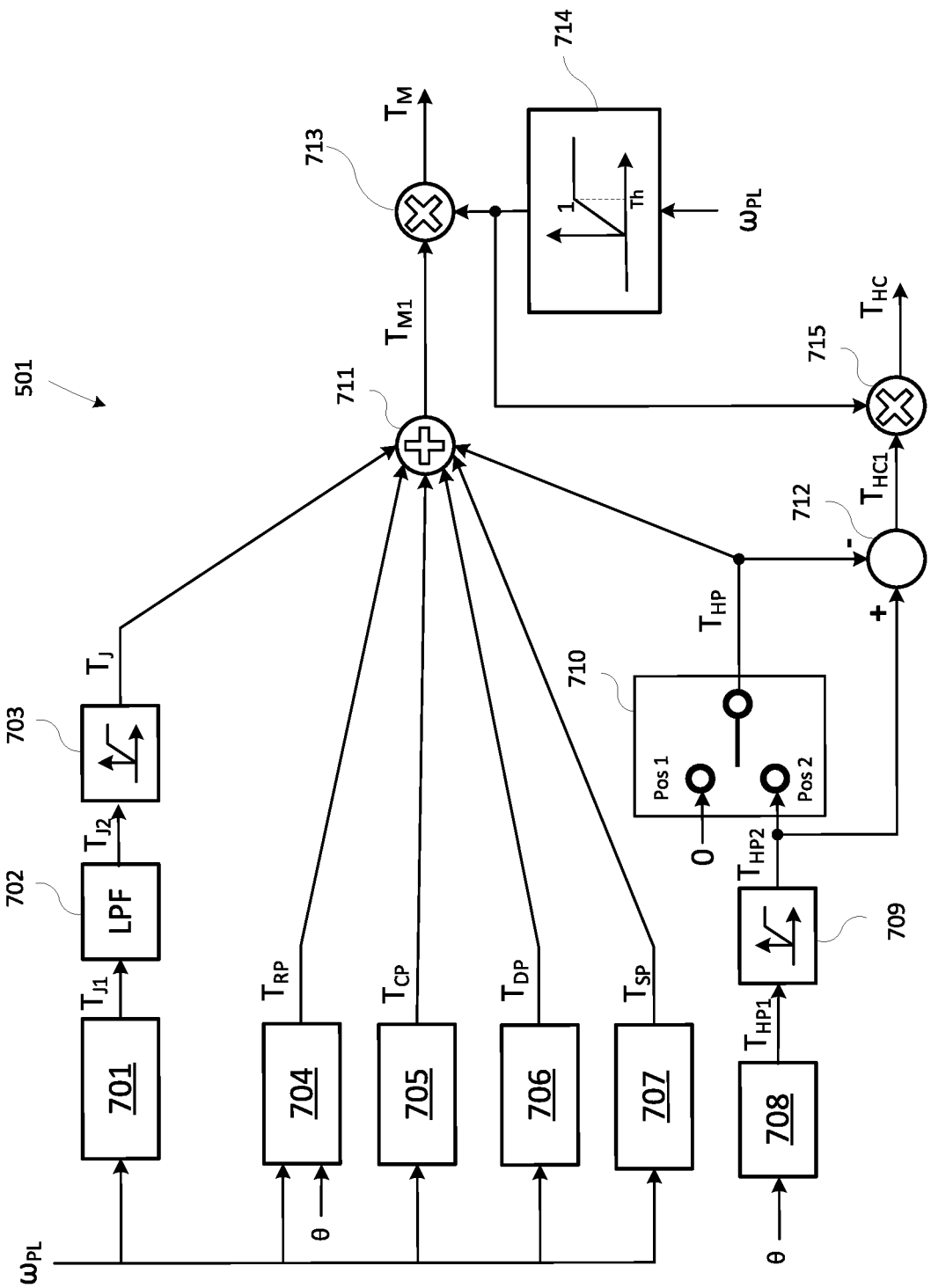
FIG. 7 illustrating the details of how model of a chainless electric bicycle is used by a resistance torque generator to compute a model resistance torque, according to an embodiment of the present invention.

Equation [20] represents the complete model of the resistance torque on the pedals 107, 114 of the chainless electric bicycle 100, which is referred as the model resistance torque in the control method. The resistance torque generator 501 in FIG. 7 is implementing the model in equation [20]. It is to be noted that many embodiments of the resistance torque generator 501 in FIG. 7 with many different combinations of resistance torque components that are described by equations [22], [23], [24], [25], [26], [27] are possible. Some resistance torque components can be dropped for simplicity and/or modified.

Pedal Control Unit

Figure 6A:
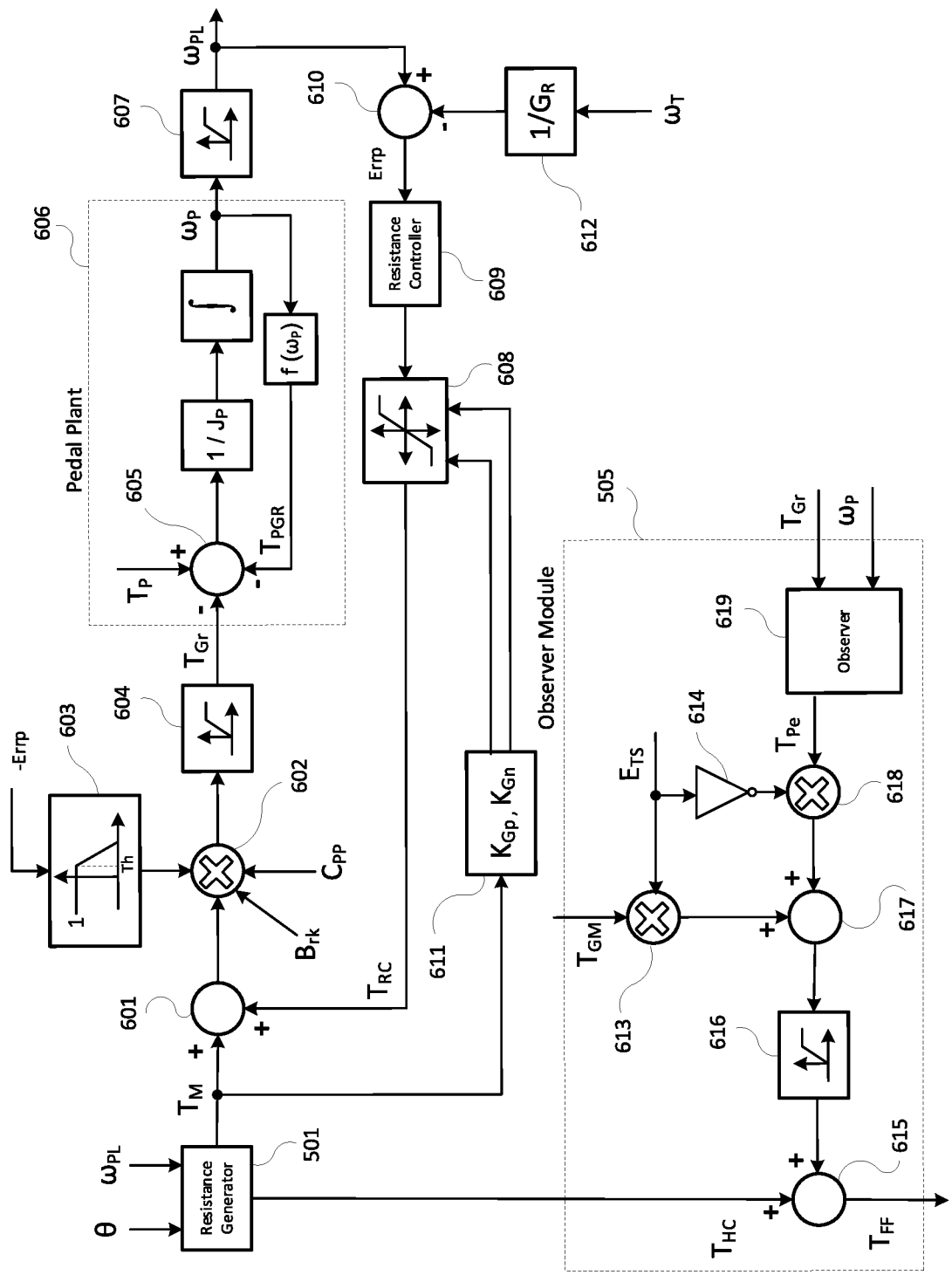
FIG. 6A illustrating the details of a pedal control unit, according to an embodiment of the present invention.
Figure 6B:
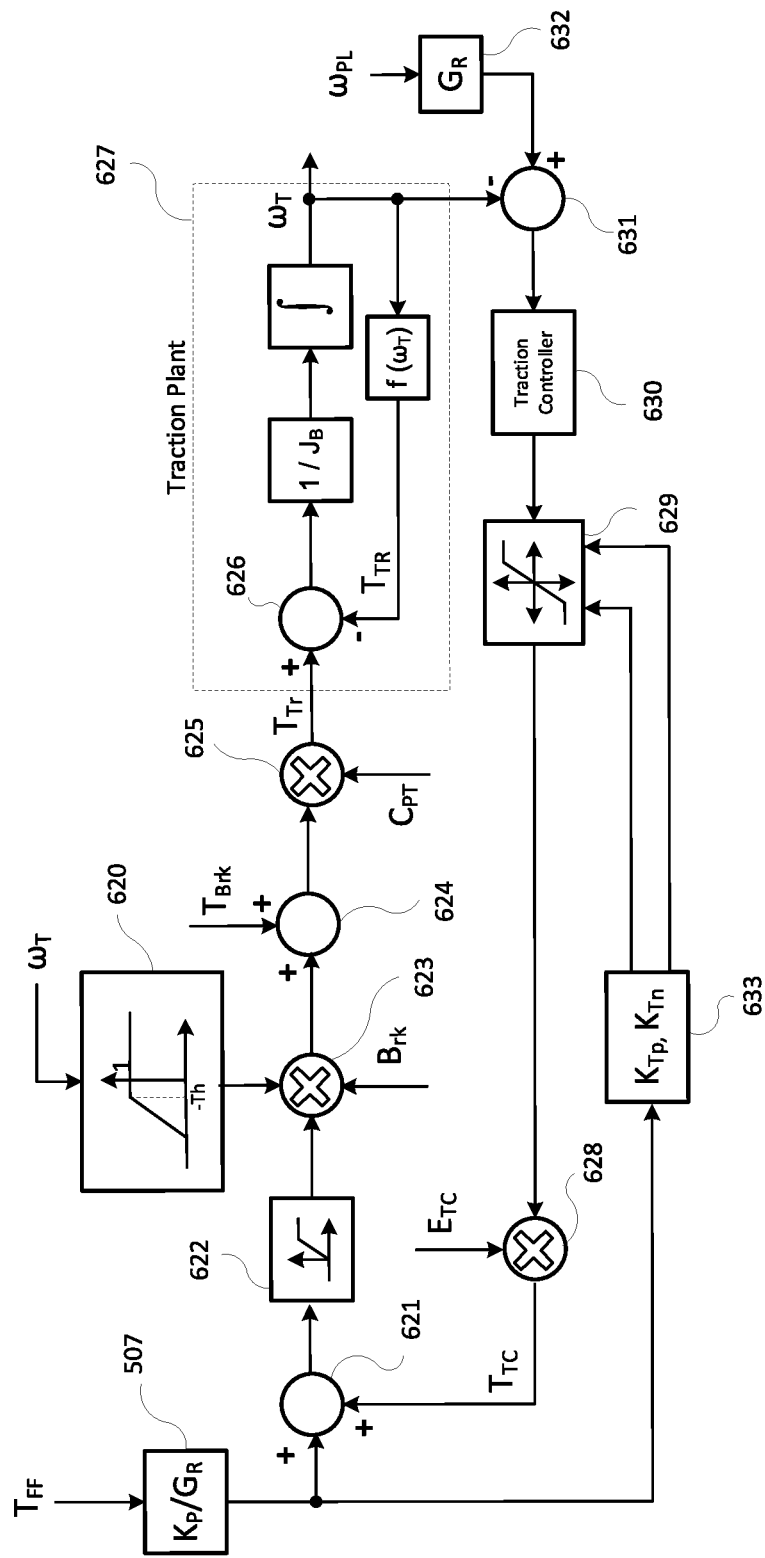
FIG. 6B illustrating the details of a traction control unit, according to an embodiment of the present invention.

According to the embodiment of the present invention, the bicycle control, hence the pedal control unit 401 in FIG. 6A and the traction control unit 402 in FIG. 6B are based on certain constraints to make the present bicycle feel as close to the chain bicycle experience as possible, provide extra convenience features to the rider and to make the entire operation safe. There are a few constraints that are implemented in the control method to achieve the aforesaid objectives as explained in the following description.

The pedal resistance torque can only be applied when the pedal speed is positive to not allow applying resistance torque in reverse and not to operate the generator 101 in motoring quadrants. The operation quadrants are depicted in FIG. 3. Therefore, the pedal resistance torque command can only be zero or a positive value meaning resisting to the pedal torque in the convention of sign that is chosen for the control method. The resistance torque computation in the pedal control unit 401 is carried out as a positive number for simplicity sake. However, once it is received by the generator torque controller 503, the sign of the torque is negated before it is regulated to oppose to the positive pedal torque. The traction torque command can only be zero or positive value except the regenerative brake torque command $T_{Brk}$ during the regenerative braking. The regenerative brake torque command $T_{Brk}$ comes from the brake control unit 403. If the pedal speed is less than the pedal referred traction speed, the resistance torque drops to zero or close to zero value, similar to the chain bicycle, which will be explained further below.

FIG. 6A and FIG. 6B depict one embodiment of the present invention, wherein the pedal speed is the bases of all the operation. In other word, if there is a positive pedal speed, then the model resistance torque is generated, only then the pedal resistance controller (blocks 608, 609, 611) is allowed to generate a resistance compensator torque and only then there could be a positive resistance torque command. Similarly, if there is a positive pedal speed only then the traction torque is generated. A resistance torque generator model does not need to be a complete and an accurate model. The function of the resistance torque generator model is to generate a baseline torque fast and establish the limits for the resistance controller 609. The limits for the resistance controller 609 are implemented by the resistance controller limiter block 608, which has a resistance controller positive limit and a resistance controller negative limit. The resistance controller positive limit and the resistance controller negative limit are calculated by the gain block 611. The main theme of the resistance controller limiter 608 is to prevent the total torque at a summation block 601 to become grossly negative value and allow the resistance controller 609 to generate enough compensation torque to keep the gear ratio in between the pedal control unit 401 and the traction control unit 402.

Figure 11:
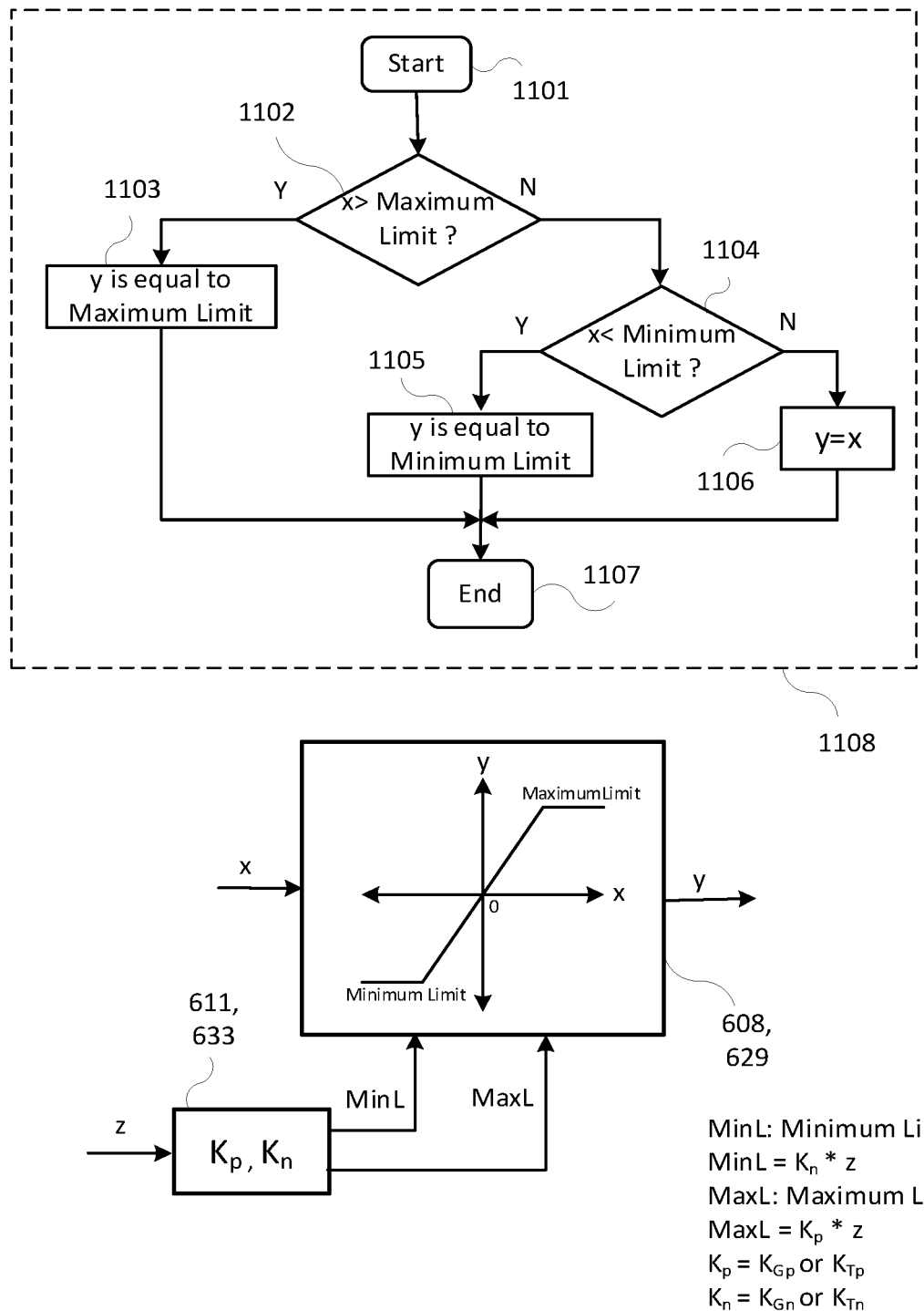
FIG. 11 showing a resistance/traction controller limiter operation, according to an embodiment of the present invention.

According to one embodiment of the present invention, FIG. 11 shows the detailed operation of the resistance controller limiter block 608 and the gain block 611. The gain block 611 is used for calculating the maximum limit and the minimum limit. A flow diagram 1108 shows how the resistance controller limiter block 608 processes the input signal x to output the limited output signal y based on the maximum limit and the minimum limit. The maximum limit is calculated by multiplying the gain block 611 input z by the positive limit gain $K_p$. The minimum limit is calculated by multiplying the gain block 611 input z by the negative limit gain $K_n$. Processing of the input signal of the resistance controller limiter block 608 starts with a start block 1101. The input signal is compared to the maximum limit with a condition block 1102. If the input signal is greater than the maximum limit, the limited output signal is set to the maximum limit as shown by a block 1103 and then the operation concludes, which is indicated by a block 1107. If the input signal is not greater than the maximum limit, the input signal is compared to the minimum limit in a condition block 1104. If the input signal is less than the minimum limit, the limited output signal is equal to the minimum limit as shown in a block 1105 and then the operation concludes, which is indicated by the block 1107. If the input signal is not less than the minimum limit, the limited output signal is equal to the input signal as shown in a block 1106 and then the operation concludes, which is indicated by the block 1107. The resistance controller positive limit in FIG. 6A is the maximum limit in FIG. 11 and the resistance controller negative limit in FIG. 6A is the minimum limit in FIG. 11. The positive limit gain $K_{Gp}$ in FIG. 6A, the gain block 611 is represented by the positive limit gain $K_p$ in FIG. 11. The negative limit gain $K_{Gn}$ in FIG. 6A, the gain block 611 is represented by the negative limit gain $K_n$ in FIG. 11.

There are many embodiments as to what type of input signal to the gain block 611 is used to calculate the resistance controller positive limit and the resistance controller negative limit.

As per embodiment of FIG. 6A, the gain block 611 is used to set the limits of the resistance controller limiter 608 based only on the model resistance torque. To obtain the resistance controller positive limit, the gain $K_{Gp}$ in the gain block 611 is multiplied by the model resistance torque. To obtain the resistance controller negative limit, the gain $K_{Gn}$ in the gain block 611 is multiplied by the model resistance torque. The gain $K_{Gn}$ is a value in the range of −1 to 0. As such the total of the model resistance torque and the resistance compensator torque in the worst case in the summation block 601 cannot go below zero torque. The gain $K_{Gp}$ is a value above zero.

In another embodiment, the gain block 611 can accept two input signals: the model resistance torque and the limited pedal speed. The limited pedal speed is explained in detail below. To obtain the resistance controller positive limit, the gain $K_{Gp}$ is multiplied by the limited pedal speed. To obtain the resistance controller negative limit, the gain $K_{Gn}$ is multiplied by the model resistance torque. The gain $K_{Gn}$ is a value in the range of −1 to 0. As such the total of the model resistance torque and the resistance compensator torque in the worst case in the summation block 601 cannot go below zero torque. The gain $K_{Gp}$ is a value above zero.

In all of the above embodiments of the resistance controller positive limit and the resistance controller negative limit calculations, the gain for each can be fix or dynamically adjustable.

Figure 10:
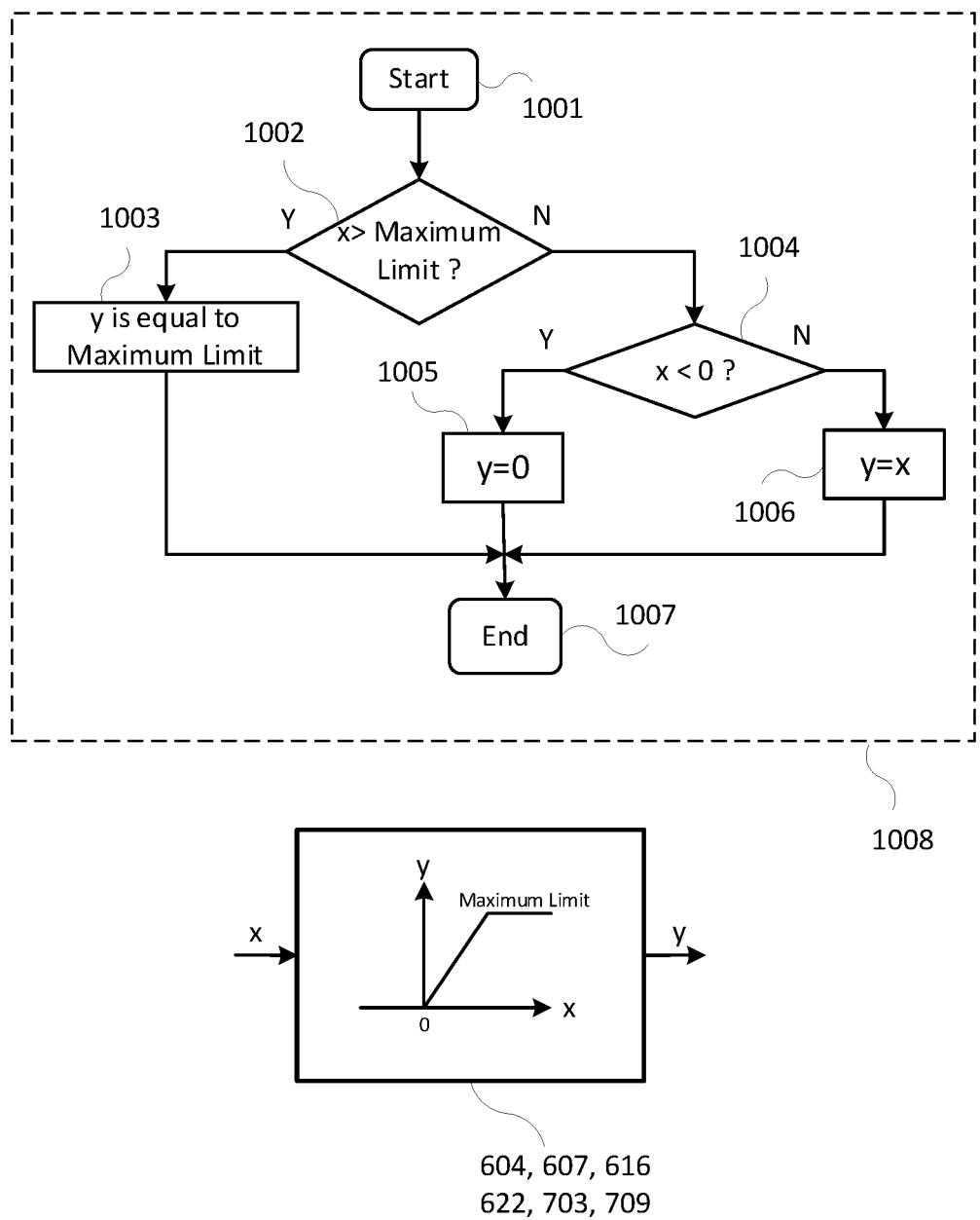
FIG. 10 showing an absolute speed/torque limiter operation, according to an embodiment of the present invention.

Since a negative pedal speed should not generate any resistance torque, an absolute speed limiter 607 in FIG. 6A limits the pedal speed. FIG. 10 explains the absolute speed/torque limiter operation in detail. In FIG. 10, the input signal of the absolute speed limiter 607 is represented by x and the limited output signal is represented by y, according to one embodiment of the present invention. The absolute speed limiter operation is depicted by a flow diagram 1008. The input signal processing of the absolute speed limiter 607 starts with a block 1001. The input signal is compared to the maximum limit in a condition block 1002. If the input signal is greater than the maximum limit, the limited output signal is equated to the maximum limit as shown in a block 1003 and then the operation concludes, which is indicated by a block 1007. If the input signal is not greater than the maximum limit, the input signal is compared to zero as shown in a block 1004. If the input signal is less than zero, the limited output signal is equated to zero as shown in a block 1005 and then the operation concludes, which is indicated by the block 1007. If the input signal is not less than zero in the condition block 1004, the limited output is equated to the input signal as shown in a block 1006 and then the operation concludes, which is indicated by the block 1007. For the absolute speed limiter block 607, the input signal is the pedal speed $\omega_P$, the limited output signal is the limited pedal speed $\omega_{PL}$, and the maximum limit is a maximum speed limit.

The resistance torque generator 501 uses equation [20], which is the pedal model for the chainless electric bicycle 100 that is needed to emulate the chain bicycle. The model is made up of various torques, which is described below what they are and how they are used to generate the model resistance torque.

According to the embodiment of the present invention, FIG. 7 depicts the detailed operation of the resistance torque generator 501. The inertia resistance torque, as its name indicates, represents the resistance torque that is generated by the bicycle inertia during speed changes. The first inertia torque $T_{J1}$ in FIG. 7 is calculated by a block 701 by using equation [22]. The pedal speed derivative can create a noisy and spiky torque calculation. To smooth out the torque calculation, a low pass filter 702 is applied. The low pass filter 702 can be any type of low pass filter. The filtered torque $T_{J2}$ is applied to an absolute torque limiter 703 to limit the filtered inertia torque to a maximum inertia torque limit if the filtered torque is above the maximum inertia torque limit and to zero if the torque calculation is a negative value. The filtered torque that is in between zero and the maximum inertia torque limit passes through the absolute torque limiter 703 and is received by a summation block 711 to calculate the first model resistance torque $T_{M1}$. The inertia resistance torque that is received by the summation block 711 is represented by $T_J$ in FIG. 7. The operation detail of the absolute torque limiter 703 is detailed in FIG. 10. For the absolute torque limiter 703, the input signal x in FIG. 10 is the filtered torque $T_{J2}$, the limited output signal y in FIG. 10 is the inertia resistance torque $T_J$, and the maximum limit in FIG. 10 is the maximum inertia torque limit.

The rolling resistance torque $T_{RP}$ is calculated by a block 704 by using equation [23]. The rolling resistance torque or viscous friction torque represent the friction caused by the rolling effect of the bicycle wheels. The rolling resistance is affected by the incline angle of the chainless electric bicycle 100. If there is any incline or decline, the rolling resistance torque will be lessened. The rolling resistance torque is received by the summation block 711 to calculate the first model resistance torque $T_{M1}$.

The coulomb resistance torque $T_{CP}$ has a constant value independent of the pedal speed. The coulomb resistance torque is calculated by a block 705 by using equation [27]. The coulomb resistance torque is received by the summation block 711 to calculate the first model resistance torque $T_{M1}$.

The drag resistance torque $T_{DP}$ is calculated by a block 706 by using equation [24]. The drag resistance torque represents the wind resistance the chainless electric bicycle 100 with the rider experiences. The drag resistance torque is received by the summation block 711 to calculate the first model resistance torque $T_{M1}$.

The stiction resistance torque $T_{SP}$ is modeled by a block 707. The stiction resistance torque is the torque that exist only short amount of initial speed and acceleration. It dies out quickly. The highest value being at zero speed. Equation [26] is the model that is used to calculate the stiction resistance torque. The stiction resistance torque is received by the summation block 711 to calculate the first model resistance torque $T_{M1}$.

The first gravity torque $T_{HP1}$ is calculated by a block 708 by using equation [25]. A positive gravity torque exists if the incline angle of the chainless electric bicycle 100 is positive. If the incline angle is positive, the front of the chainless electric bicycle 100 is facing upwards. A negative incline does not create a resistance torque, therefore, the first gravity torque $T_{HP1}$ calculation is processed by an absolute torque limiter 709. The operation detail of the absolute torque limiter 709 is detailed in FIG. 10. When a switch block 710 is in position 2, it transmits the gravity torque $T_{HP2}$ ($T_{HP}=T_{HP2}$) to the summation block 711 to be added to the rest of the resistance torques.

A gravity torque compensation feature is introduced to enhance the rider experience, wherein the gravity resistance torque is felt or not felt by the rider on the pedals 107, 114 either by adding the gravity resistance torque $T_{HP}$ to the first model resistance torque calculation, in which case the gravity torque compensation is disabled, or by adding it to the estimated pedal torque calculation as the gravity compensator torque $T_{HC}$, in which case the gravity torque compensation is enabled, to calculate the feedforward torque that is sent to the traction control unit 402. To implement the gravity torque compensation feature, the gravity torque output $T_{HP2}$ from the absolute torque limiter 709 is fed to the switch block 710 (position 2) and the positive input of a summation block 712. When the switch block 710 is in position 1, zero gravity torque reaches to the summation block 711 and the negative input of the summation block 712. Since the summation block 712 receives the gravity resistance torque $T_{HP2}$ on its positive input, the output of it becomes equal to the gravity resistance torque $T_{HP2}$ ($T_{HC1}=T_{HP2}$). Hence, the gravity torque compensation is enabled. When the switch block 710 is in position 2, the negative input of the summation block 712 also receives the gravity resistance torque $T_{HP}$ ($T_{HP}=T_{HP2}$), the total sum on its output becomes zero resulting in zero gravity compensator torque ($T_{HC1}=0$). Hence, the gravity torque compensation is disabled.

Now that the first model resistance torque $T_{M1}$ is obtained based on the bicycle model via the summation unit 711 before it is output to the rest of the control system as the model resistance torque $T_M$, it is needed to make sure there is a smooth transition from zero pedal speed to positive pedal speed. As it was defined before, one of the constraints of the control method is to not generate any resistance torque at zero pedal speed and negative pedal speed. A zero-to-one block 714 and multiplier blocks 713 and 715 have been introduced to accomplish the aforesaid goal. The details of the zero-to-one block operation is illustrated in FIG. 12.

Figure 12:
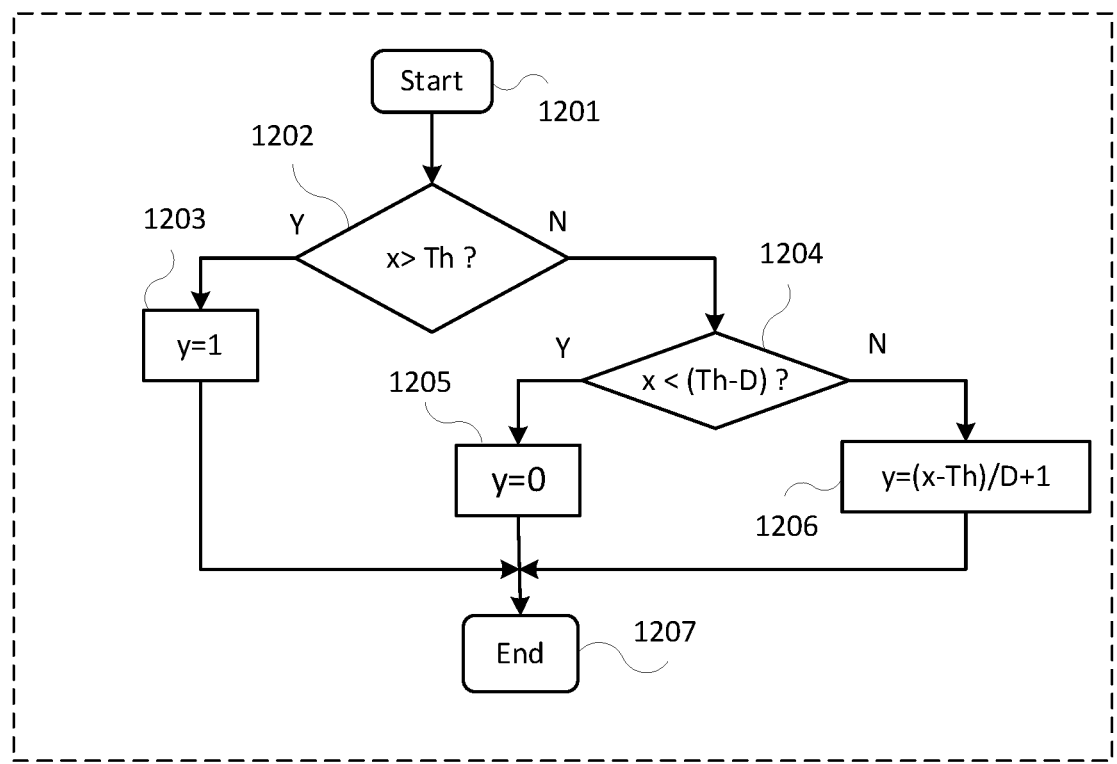
FIG. 12 showing a zero-to-one block, according to an embodiment of the present invention.
Figure 12:
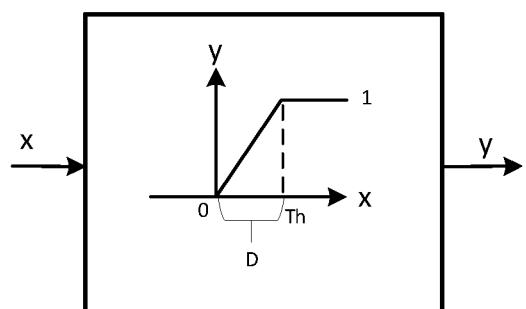

In FIG. 12, the input signal to the zero-to-one block 714 is represented by x and the output from the zero-to-one block 714 is represented by y, according to one embodiment of the present invention. A flow diagram 1208 depicts the operation of the zero-to-one block 714. The processing of the input signal starts with a block 1201. The input signal is compared to a threshold in a condition block 1202. If the input signal is greater than the threshold, the output signal is set to one and then the operation concludes, which is indicated with a block 1207. If the input signal is not greater than the threshold, the input signal is compared by a compare value.

The compare value is obtained by subtracting a delta from the threshold. The delta and the threshold are chosen independently. The delta is always a positive number and the threshold can be a positive number, a negative number or zero. The delta determines the transition slope from zero to one. If the input signal is less than the compare value as shown in a condition block 1204, the output signal is set to zero and then the operation concludes, which is indicated with the block 1207. If the input signal is not less than the compare value as shown in the condition block 1204, the output is calculated based on the equation in a block 1206 and then the operation concludes, which is indicated by the block 1207. The input signal to the zero-to-one block 714 is the limited pedal speed $\omega_{PL}$. In this embodiment, the transition is linear, which is calculated by the block 1206. However in other embodiments, a non-linear transition can also be chosen.

The multiplier block 713 receives the output of the zero-to-one block 714, the first model resistance torque $T_{M1}$ from the summation block 711 and multiplies them to calculate the model resistance torque $T_M$. As a result, the model resistance torque, hence, the resistance torque command to the generator 101, ramps up and down away and to zero pedal speed smoothly. Similarly, the multiplier block 715 is used to provide smooth transition to or away from zero pedal speed when the gravity torque compensation is enabled by multiplying the gravity compensator torque $T_{HC1}$ with the zero-to-one block 714 output. The calculated torque becomes the gravity compensator torque $T_{HC}$ and another output from the resistance generator 501 in addition to the model resistance torque. As illustrated in FIG. 12, the transition to zero output can be shifted above zero speed by adjusting Delta to provide a backlash to the torque generation.

In FIG. 6A, the resistance compensator 504 is composed of a gear ratio conversion block 612, the pedal absolute speed limiter block 607, a summation block 610, the resistance controller block 609, the resistance controller limiter block 608, and the gain block 611. The resistance controller 609 is a closed loop controller, which generates an additional resistance torque $T_{RC}$ to maintaining the gear ratio. The limited pedal speed is the speed command and the pedal referred traction speed is the feedback speed to the resistance controller 609. The speed error is calculated by the summation block 610, which is the input to the resistance controller 609. The traction speed is the response of a traction plant 627. Thereby, the model imperfections are built into the speed error. The additional torque that the resistance controller 609 computes is the torque that is missing or excess of in the model resistance torque. The resistance controller 609 can be configured with various controllers such as, but not limited to, a PI (proportional, integral), a PID (proportional, integral, differential), a state feedback, a state feedback with integral action, a linear quadratic regulator, a model predictive controller, a model predictive controller with reinforcement learning.

The summation block 601 is where the resistance compensator torque is added to the model resistance torque. A multiplier block 602 multiplies the output of the summation block 601 by the output of a one-to-zero block 603, the brake signal $B_{rk}$, and the pedal charge protection signal $C_{PP}$. The details of the one-to-zero block operation is presented in FIG. 13.

Figure 13:
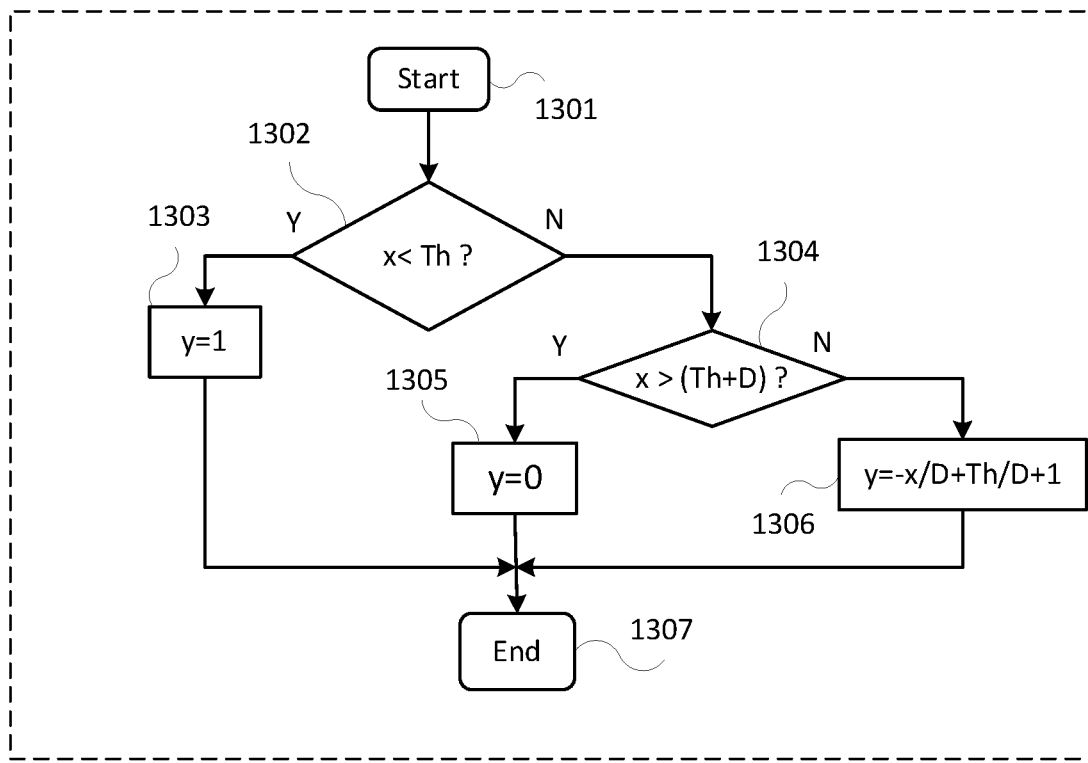
FIG. 13 showing a one-to-zero block, according to an embodiment of the present invention.
Figure 13:
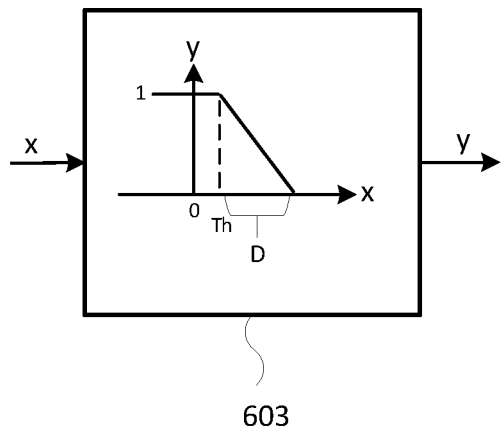

In FIG. 13, the input signal is represented by x and the output signal is represented by y, according to one embodiment of the present invention. The operation diagram of the one-to-zero block 603 is demonstrated by a flow diagram 1308. The input signal processing of the one-to-zero block 603 starts with a block 1301. The input signal is compared to a threshold with a condition block 1302. If the input signal is less than the threshold, the output signal is set to one and the operation concludes, which is indicated by a block 1307. If the input signal is not less than the threshold, the input signal is compared with a compare value as shown by a condition block 1304. The compare value is calculated by subtracting a delta from the threshold. The delta is always a positive number that determines the slope of the transition from one to zero. The threshold can be a positive number, a negative number or zero. If the input signal is greater than the compare value, the output is set to zero and the process concludes, which is indicated by the block 1307. If the input signal is not greater than the compare value, the output signal is calculated by the equation described in a block 1306 and then the operation concludes as indicated by the block 1307. The input signal to the one-to-zero block 603 is a negated value of the speed error obtained by the summation block 610.

The output of the multiplier block 602 is processed by an absolute torque limiter 604 to limit the resistance torque to values in between zero and a maximum torque value. The detailed operation of the absolute torque limiter 604 is illustrated in FIG. 10. The output of the absolute torque limiter 604 constitutes the resistance torque command to the pedal plant 606.

The function of the one-to-zero block 603 is to cut of the resistance torque command if the pedal referred traction speed rises above the pedal speed in the amount of a speed threshold. Therefore, the negative speed error that was calculated for the resistance controller 609 is used as the input. The transition from one to zero on the output of the one-to-zero block 603 is gradual, which is determined by the delta in FIG. 13. In other words, the output takes the values in between one and zero based on the input. In FIG. 13, a linear transition from one to zero is illustrated, however, the transition can be a non-linear function by modifying the equation in the block 1306. The function of the pedal charge protection signal $C_{PP}$ is to cut off the resistance torque command if the battery 103 is not chargeable, to protect the power electronics, the battery 103 and other systems from failure since the power flow from the generator 101 may not be consumed by the motor 102 and excess energy can build up in the DC bus 202. When no pedal charge protection is needed, the signal $C_{PP}$ becomes one, which is the normal operation. When the pedal charge protection is needed, the signal $C_{PP}$ becomes zero.

Figure 8:
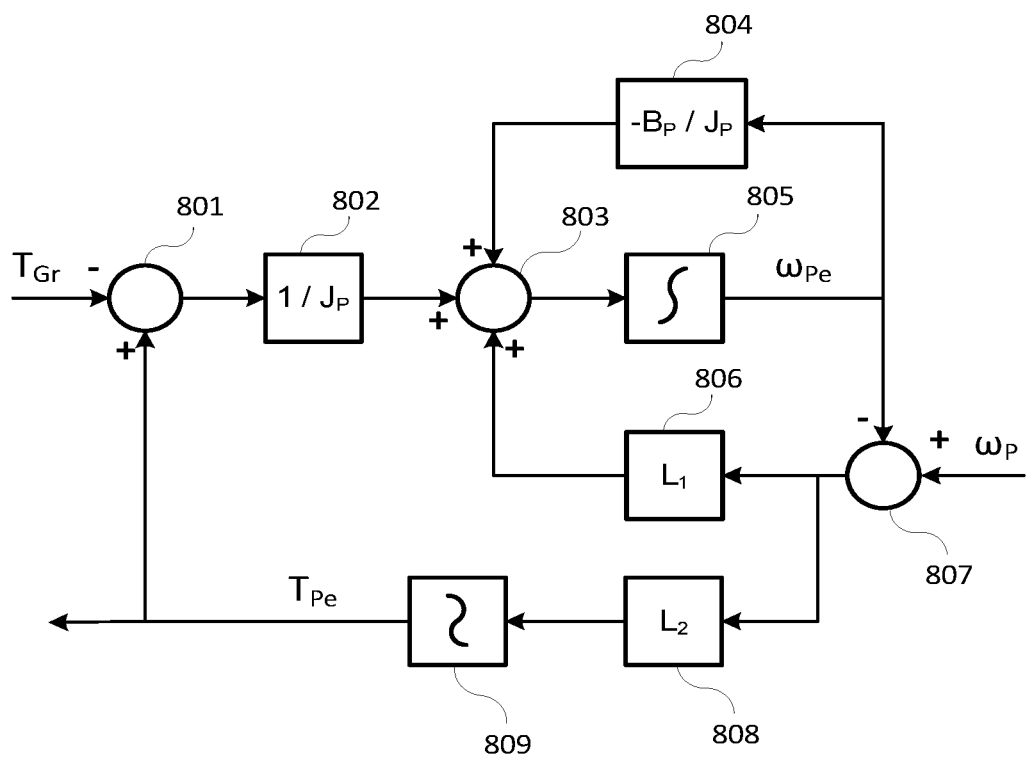
FIG. 8 illustrating how an observer block calculates the estimated pedal torque, according to an embodiment of the present invention.

The function of the pedal control unit 401 is to generate the feedforward torque for the traction control unit 402 in addition to generating the resistance torque command. In one embodiment, an estimated pedal torque is used in calculating the feedforward torque. An observer block 619 calculates the estimated pedal torque based on the observer speed error and the resistance torque command. The detailed operation of the observer block 619 is shown in FIG. 8, which implements the following observer model equations:

$$\frac{d\omega_{Pe}}{dt} = \frac{-B_P}{J_P}\omega_{Pe} + \frac{1}{J_P}(T_{Pe} - T_{Gr}) + L_1(\omega_P - \omega_{Pe}) \quad [28]$$

$$\frac{dT_{Pe}}{dt} = L_2(\omega_P - \omega_{Pe}) \quad [29]$$

Wherein $\omega_{Pe}$ is the estimated pedal speed, $T_{Pe}$ is the estimated pedal torque, $T_{Gr}$ is the resistance torque command, and $L_1$ and $L_2$ are the observer gains. The observer speed error is calculated by subtracting the estimated pedal speed from the pedal speed by a summation block 807. The speed error is multiplied by a gain block 808 to find the input signal to an integrator block 809, which integrates its input signal to calculate the estimated pedal torque. The gain block 808 holds the gain $L_2$. The speed error is also multiplied by a gain block 806 to find the first input signal to a summation block 803. The gain block 806 holds the gain $L_1$. The resistance torque command is subtracted from the estimated pedal torque by a summation block 801 to determine a torque difference. The torque difference is divided by the pedal assembly inertia $J_P$ to determine the second input signal to the summation block 803. The third input signal to the summation block 803 is calculated by multiplying the estimated pedal speed by a gain block 804, wherein the gain is $-B_P/J_P$ in the gain block 804. The summation block 803 sums the first input signal, the second input signal and the third input signal to calculate the input signal to an integrator block 805. By integrating its input signal, the integrator block 805 calculates the estimated pedal speed.

In another embodiment as illustrated in FIG. 6A, a measured pedal torque $T_{GM}$ from a torque sensor is used instead of the estimated pedal torque. To allow the configuration of these two different ways of the feedforward torque calculation, a torque sensor enable signal $E_{TS}$ is introduced with multiplier blocks 613, 618 and a signal inverter block 614. The torque sensor enable signal can only take the value of one or zero. If the torque sensor enable signal has the value of one, the measured pedal torque is used in the feedforward torque calculation. If the torque sensor enable signal has the value of zero, the estimated pedal torque is used in the feedforward torque calculation. If the torque sensor enable signal has the value of one, the measured pedal torque reaches to an observer absolute torque limiter block 616 through a summation block 617 since the signal inverter block 614 makes the $E_{TS}$ signal reaching to the multiplier block 618 zero. As a result, the inverted $E_{TS}$ signal makes the estimated pedal torque reaching to the summation block 617 zero. The operation detail of the observer absolute torque limiter 616 is detailed in FIG. 10. The maximum limit in FIG. 10 is a maximum observer torque limit for the observer absolute torque limiter 616.

In the final step, a summation block 615 receives the gravity compensator torque and the output of the absolute torque limiter 616, which represent the pedal torque, to calculate the feedforward torque for the traction control unit 402. The gravity compensator torque will be a positive value if the incline angle is positive, the gravity torque compensation is enabled and the limited pedal speed is above zero. The gravity compensator torque will be a zero value if the incline angle is negative or the limited pedal speed is zero. The gravity compensator torque will be zero value always if the gravity torque compensation is disabled.

Traction Control Unit

According to the embodiment of the present invention, one of the functions of the scaler block 507 in FIG. 6B is to adjust the feedforward torque that is received from the pedal control unit 401 to the gear ratio that is used by dividing the feedforward torque by the gear ratio.

The other function of the scaler block 507 can be explained as in the following. The scaler block 507 also includes the traction torque assist gain $K_P$, when adjusted, it can either enable the traction assistance or it can enable the ride charge. The traction torque assist gain $K_P$ when it is set to one, both the traction assistance and the ride charge features are disabled. When $K_P$ is set to a value above one, it activates the traction assistance feature by increasing the feedforward torque compared to the same traction speed when $K_P$ was one. The higher the traction torque assist gain $K_P$, the higher the assistance amount since the feedforward torque is multiplied by $K_P$. When the traction torque assist gain is set to a value below one, it activates the ride charge feature by decreasing the feedforward torque compared to the same traction speed when $K_P$ was one. The lower the traction torque assist gain $K_P$, the higher the ride charge amount. When the battery no longer chargeable, $K_P$ is set automatically to one.

Exact operation of the torque assist gain can be explained as in the following description. In an equilibrium, when the pedal speed and the traction speed are synchronized and $K_P$ is one, an increase in $K_P$ will cause an increase in the traction speed. When the traction speed increases, the negative speed error received by the resistance controller 609 will lower its torque compensation to decrease the resistance torque applied to the generator 101, which in turn will require less pedal torque from the rider for the same pedal speed when $K_P$ was one. Less pedal torque will be estimated by the observer block 619 or measured by the torque sensor and will result in less feedforward torque to obtain the same traction torque command and the same traction speed when $K_P$ was one. Hence, the rider exerts less pedal torque to go at the same speed than before the $K_P$ was increased. The decrease in the pedal torque means decrease in the pedal power to go at the same speed when $K_P$ was one, where the decrease in power will be supplemented by the battery 103.

Similarly, in an equilibrium, when the pedal speed and the traction speed are synchronized and $K_P$ is one, a decrease in $K_P$ will cause a decrease in the traction torque and a decrease in the traction speed. When the traction speed decreases, the increased positive speed error received by the resistance controller 609 will cause an increase in its torque compensation that will increase the resistance torque applied to the generator 101, which in turn will require more pedal torque from the rider to go at the same traction speed when $K_P$ was one. As a result, more pedal torque will be estimated by the observer block 619 or measured by the torque sensor and will result in more feedforward torque to apply the same traction torque and to go at the same traction speed when $K_P$ was one. Hence, the rider exerts more pedal torque to go at the same speed than before the $K_P$ was decreased. The increase in the pedal torque means increase in the pedal power to go at the same speed when $K_P$ was one, wherein the increase in power will cause less power draw from the battery 103 or provide charging power to the battery 103. Any increase in the pedal power first will need to exceed the power losses in the system before the battery 103 can be charged. Therefore, first it will be less power draw from the battery 103 until the losses are completely offset and then as the excess power flow increases to the DC bus 202, the battery 103 will start to charge.

Alternative to the traction torque assist gain $K_P$, the traction torque compensator 506 in FIG. 5 with a closed loop controller, when enabled, can adjust the torque assistance dynamically based on the speed error. It generates an additional compensation torque to synchronize the pedal speed and the traction speed quickly. In FIG. 6B, the traction torque compensator 506 is detailed, and it is composed of a gear ratio conversion block 632, a summation block 631, a traction controller block 630, a traction controller limiter block 629, a gain block 633, and a multiplier block 628. The output of the multiplier block 628 constitutes the traction compensator torque $T_{TC}$.

When the traction torque compensator 506 is enabled with the traction compensator enable signal $E_{TC}$, the torque assist gain $K_P$ is kept at one and cannot be adjusted in any direction. That means the ride charge feature cannot be activated because any decrease in $K_P$ below one will be compensated to negate its reduction effect by the traction torque compensator 506, therefore, making the ride charge ineffective. The value $E_{TC}$ is zero or one. When it is one, the traction torque compensator 506 is enabled and when it is zero it is disabled. The multiplier block 628 multiplies the traction compensator enable signal $E_{TC}$ and the output of the traction controller limiter block 629 to determine if the traction compensator torque will be propagated to a summation block 621 to be used in the traction torque command generation.

The summation block 631 calculates the speed error for the traction controller input. The traction speed error is the difference of the traction referred limited pedal speed and the traction speed. The traction controller output is the input to the traction controller limiter block 629, which limits the traction controller torque to a traction controller positive limit and a traction controller negative limit. The detail of the traction controller limiter block 629 and the gain block 633 is depicted in FIG. 11 and is also described in the foregoing description while explaining the detail of the resistance controller limiter block 608. The traction controller positive limit is determined by multiplying the gain $K_{Tp}$ by the output of the scaler block 507, the first traction torque. The traction controller negative limit is determined by multiplying the gain $K_{Tn}$ by the first traction torque. $K_{Tn}$ is a value in the range of −1 to 0. $K_{Tn}$ is not set below −1 to not cause any negative torque propagating through the rest of the traction control unit. $K_{Tp}$ is a value above zero. The traction controller 630 is a closed loop controller, which generates the required torque to synchronize the pedal speed and the traction speed quickly, thus drawing required power to accomplish it from the battery 103. The traction controller 630 can be configured with various controllers such as, but not limited to, a PI (proportional, integral), a PID (proportional, integral, differential), a state feedback, a state feedback with integral action, a linear quadratic regulator, a model predictive controller, a model predictive controller with reinforcement learning.

The traction torque limiter module 508 in FIG. 5 has been illustrated in more detail in FIG. 6B. The function of the traction torque limiter module 508 is to make sure the certain conditions are met for the generated traction torque to be the actual torque command, which is applied to the motor 102. The traction torque limiter module 508 is composed of the summation block 621, an absolute torque limiter block 622, a multiplier block 623, a zero-to-one block 620, a summation block 624, and a multiplier block 625. The summation block 621 adds the first traction torque and the traction compensator torque together to calculate the torque that is applied to the input of the absolute torque limiter block 622. The absolute torque limiter block 622 limits the torque input between zero and a maximum torque value on its output, which is applied to the input of the multiplier block 623. The operation detail of the absolute torque limiter 622 is detailed in FIG. 10. The multiplier block 623 has two other inputs: the brake signal $B_{rk}$, and the output of the zero-to-one block 620. The brake signal $B_{rk}$ is used to prevent generating a non-zero traction torque command if there is braking. $B_{rk}$ signal is one when there is no braking, and it is zero if there is braking. The zero-to-one block 620 is used to prevent regenerative operation of the motor 102 when there is no braking. In other words, if on an incline startup, the chainless electric bicycle 100 rolls backwards and results in a negative traction speed, it will be in a regenerative operation if the pedal speed is positive. This operation is only allowed up to a negative speed threshold. Hence, the output of the zero-to-one block 620 drops from one to zero linearly or non-linearly based on the traction speed input. The detail of the zero-to-one block 620 for the linear transition from one to zero is illustrated in FIG. 12 and explained in detail previously with the operation of the zero-to-one block 714. The input signal of the zero-to-one block 620 is the traction speed.

The summation block 624 allows the regenerative brake torque $T_{Brk}$ to be applied to the motor 102. When the braking torque is a non-zero value, $B_{rk}$ signal will be zero and not allow the traction torque from the output of the absolute torque limiter block 622 to reach to the summation block 624. The braking torque $T_{Brk}$ is only non-zero and negative value during braking if the regenerative braking conditions are met, which is explained in detail below. The multiplier block 625 is the last stage before generating the traction torque command $T_{Tr}$ to be applied to the motor 102. The torque that reaches to the multiplier block 625 from the summation block 624 is either the traction torque command or the regenerative brake torque command $T_{Brk}$. The multiplier block 625 multiplies the traction charge protection signal $C_{PT}$ by the torque that is received from the summation block 624. $C_{PT}$ is one if the battery 103 can be charged. $C_{PT}$ is zero if the battery 103 cannot be chargeable. Both $C_{PT}$ and $B_{rk}$ signals can only be one or zero.

The motor torque controller 509 in FIG. 5, is part of the traction plant 627 in FIG. 6B since the electromagnetic torque generation time constant is much smaller than the mechanical system time constant.

Braking

The present invention includes the mechanical brake system and the electric brake system, which consists of the actuator (electromechanical or electromagnetic) brake 106 and the regenerative brake. The electric brake system is activated by the electric brake handle 108 as shown in FIG. 1. The electric brake handle 108 when pressed, sends a non-zero electric brake handle signal $S_{bh}$ to the brake control unit 403 in FIG. 5, which then activates one or two braking methods available: the actuator brake 106 and the regenerative brake. There are variety of actuator brake types with various ways of operation and control. All brake types in the end control the friction force or the friction torque, which are controlled directly by the current applied. In this embodiment, the actuator is assumed to brake when power is applied (current is non-zero), and it contains a current regulator. Therefore, only the actuator brake current command is provided by the brake control unit 403. The same principals demonstrated in the present invention can be applied to control the force or the torque with a brake specific force/torque-to-current mapping as well.

The brake control unit 403 generates the brake signal $B_{rk}$, the regenerative brake torque command $T_{Brk}$, and the actuator brake current command $I_{ar}$, which results in the brake force $F_a$ from the actuator, based on inputs: the traction speed $\omega_T$, the electric brake handle signal $S_{bh}$, the mechanical brake handle signal $S_{bhm}$, and the traction charge protection signal $C_{PT}$. When the rider presses the electric brake handle 108, the level of squeeze will determine the total amount of electric brake handle signal $S_{bh}$ to be applied to the propelling wheel. The electric brake handle signal $S_{bh}$ is a value in the range of zero to one. Zero being no brake, and one being the 100% brake. The mechanical brake handle signal is only used to determine the value of $B_{rk}$ signal when there is no electrical brake signal. $S_{bhm}$ only indicates if the mechanical brake is initiated or not. Therefore, it does not need to be a range of numbers. It could be a binary number of zero or one. The brake control unit 403 in FIG. 5 runs the brake control method in FIG. 9.

Figure 9:
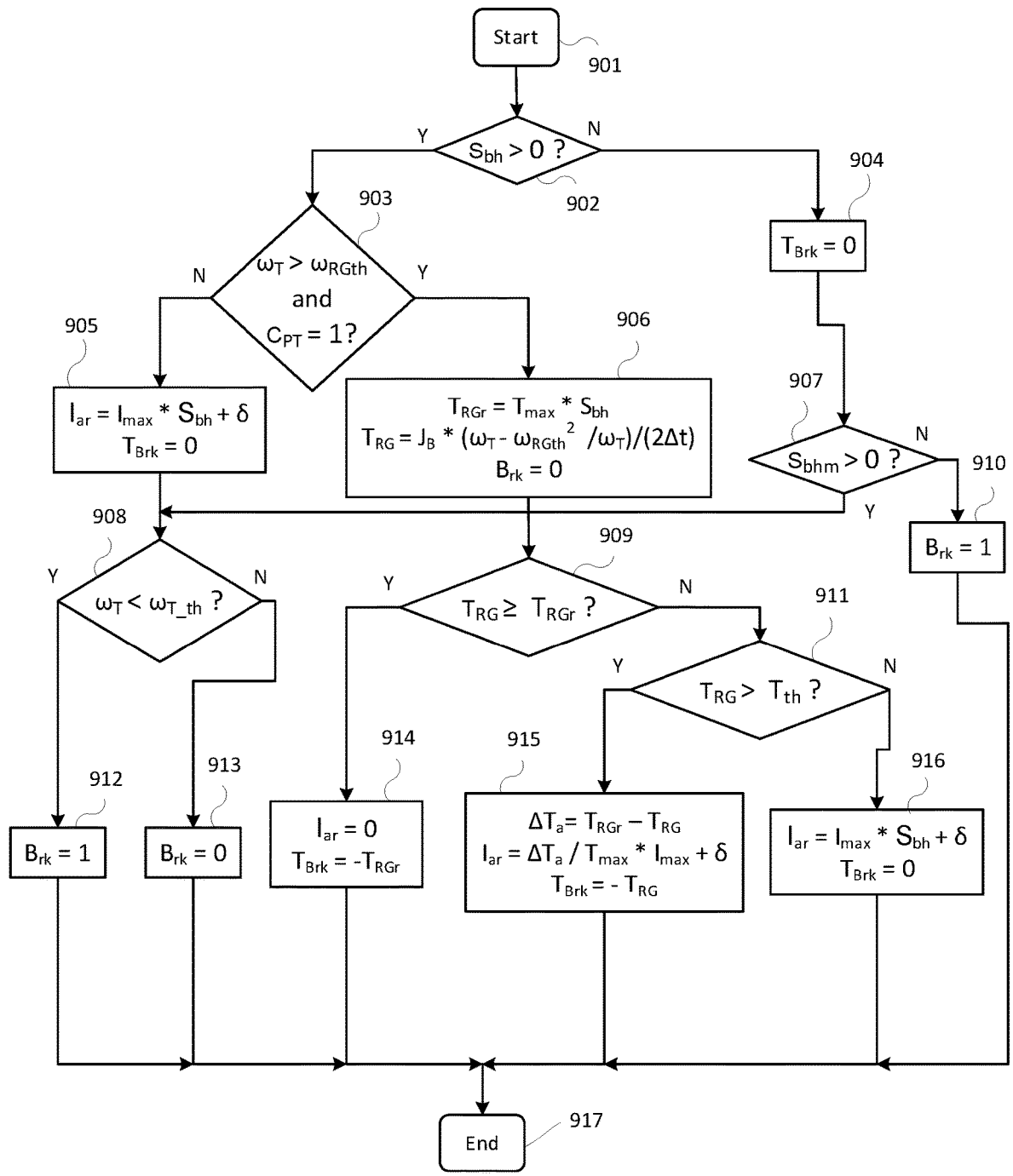
FIG. 9 showing the details of a brake control unit operation, according to an embodiment of the present invention.

Referring to FIG. 9, the brake control method starts from a start block 901, and checks to see if there is a non-zero electric brake handle signal, which is shown by a condition block 902. If there is no electric brake handle signal ($S_{bh}$=0), it sets the regenerative brake torque command $T_{Brk}$ to zero, which is shown by a block 904, and then it checks the mechanical brake handle signal $S_{bhm}$, which is shown by a condition block 907. If the mechanical brake handle signal is also zero, the brake signal $B_{rk}$ is set to one, which is shown by a block 910, in other words, no brake operation and the control unit execution is existed, which is indicated by a block 917. If the mechanical brake handle signal is a non-zero value, the control execution goes to a condition block 908, which is described below.

The brake control unit 403 checks the electric brake handle signal every brake control unit execution period, which is indicated by the condition block 902. If there is an electric brake handle signal ($S_{bh}$>0), the brake control unit 403 checks if the traction speed $\omega_T$ is above the regenerative speed threshold $\omega_{RGth}$ and if the battery charge protection is not active, which is indicated by a condition block 903. If at least one of the conditions in the condition block 903 is not true, only the actuator brake 106 is used by commanding the actuator brake current $I_{ar}$, which is an indicative of the brake force $F_a$. $I_{ar}$ is calculated as:

$$I_{ar} = I_{a\_max} S_{bh} + \delta \quad [30]$$

which is indicated by a block 905. Wherein, $I_{a\_max}$ is the maximum allowed current (correlating to the maximum brake force) to the actuator, $\delta$ is the offset current to prevent any backlash. The backlash can be due to the gap between a brake pad and the actuator brake disc 105, and a spring that holds the brake pad in a non-brake position. Since only the actuator brake force is used, the regenerative brake torque $T_{Brk}$ is set to zero in the block 905.

Next the control method determines the state of brake signal $B_{rk}$ by first checking if $\omega_T$ is less than a speed threshold $\omega_{T\_th}$, which is shown in a condition block 908. If this condition is false, $B_{rk}$ is set to zero, which is shown in a block 913. If the condition block 908 is true, $B_{rk}$ is set to one in a block 912 to allow low speed brake startup, which allows applying a positive traction torque to the motor 102 to assist a startup with the brake handles 108, 113 pressed in an incline position. It is to be noted that $\omega_{RGth}$ is always greater than $\omega_{T\_th}$. Once $B_{rk}$ is set to zero or one as a result of the condition block 908, the brake control unit/loop execution is exited as indicated by the block 917, and the control method execution goes back to the start block 901 in the next period.

Once determined there is an electric brake signal ($S_{bh}$>0), if the condition block 903 is true, the brake control unit 403 sets $B_{rk}$ signal to zero, which is shown by a block 906 to prevent traction torque and the resistance torque and performs the following calculations in the block 906:

$$T_{RGr} = T_{max} S_{hb} \quad [31]$$

$$T_{RG} = \frac{1}{2} \frac{J_B}{\Delta t} \left( \omega_T - \frac{\omega_{RGth}^2}{\omega_T} \right) \quad [32]$$

Wherein, $T_{max}$ is the maximum torque allowed to the motor 102, $T_{RGr}$ is the reference regenerative brake torque, $T_{RG}$ is the available regenerative brake torque, $\Delta t$ is the execution period of the brake control unit 403.

Next, the brake control unit 403 compares $T_{RG}$ and $T_{RGr}$, which is shown in a condition block 909. If $T_{RG}$ is equal or greater than $T_{RGr}$, there is enough regenerative brake energy to the next period of the brake control unit execution to apply only the regenerative brake torque. That means $T_{Brk}$=–$T_{RGr}$ and $I_{ar}$=0, which is shown in a block 914. As a result, the brake control unit execution is exited as indicated by the block 917, and its execution goes back to the start block 901 in the next brake control unit execution period.

If $T_{RG}$ is less than $T_{RGr}$, as indicated by the condition block 909, the brake control method checks to determine if $T_{RG}$ is more than the torque threshold $T_{th}$, which is shown in a condition block 911. If the $T_{RG}$ is more than $T_{th}$, the regenerative brake still can be used in combination with the actuator brake 106. Therefore, $T_{Brk}$=–$T_{RG}$ and the actuator brake current command is calculated as shown below and indicated by a block 915:

$$\Delta T_a = T_{RGr} - T_{RG} \quad [33]$$

$$I_{ar} = \frac{\Delta T_a}{T_{max}} I_{a\_max} + \delta \quad [34]$$

However, if the condition block 911 is false, it means the available regenerative brake torque is too low to be applied as the regenerative brake torque, hence only the actuator brake 106 is used based on equation [30] as shown in a block 916. Following the above calculations, the brake control unit execution is exited as indicated by the block 917, and the control method execution goes back to the start block 901 in the next brake control unit execution period.

It should be noted that the present invention is flexible. As such, in another embodiment, only the actuator brake 106 is used, by setting $\omega_{RGth}$ to a very high number where $\omega_T$ can never reach as such bypassing the regenerative brake. Furthermore, in another embodiment, the electric brake system can be deactivated completely and only use the mechanical brake system by just setting $S_{bh}$ to zero all the time.

Operating Modes

The bicycle operation from the user standpoint can be divided into a number of different operating cases: Startup, cruising, coasting, reverse pedaling, braking and moving without riding.

Startup

Startup condition can be divided into three different startup cases: level startup, incline startup and decline startup. In the level startup, the incline angle is zero or very close to zero with respect to the effect of the total mass of the chainless electric bicycle 100 on the gravity resistance torque. At the beginning, the pedal speed and the traction speed are zero. First the pedal speed becomes positive value and starts accelerating by the rider applied pedal torque.

Once the pedal speed is positive, the pedal control unit 401 will start generating the resistance torque. The feedforward torque will propagate to the traction control unit 402, which in turn will initiate the forward traction motion.

In the incline startup, at the beginning, the rider applies the pedal torque. As a result, the pedal speed becomes positive. Once the pedal speed is positive, the pedal control unit 401 will start generating the resistance torque. The feedforward torque will propagate into the traction control unit 402, which in turn will initiate the forward traction motion. If the traction torque is not large enough to overcome the traction resistance torque, the chainless electric bicycle 100 rolls backwards and the traction speed becomes negative. As long as the pedal speed is positive, the traction torque will persist and increase. Since the traction speed is negative, the error input to the resistance controller 609 becomes even larger. As a result, the pedal/generator resistance torque becomes larger. The larger pedal/generator resistance torque will give rise to a larger feedforward torque, which will propagate to the traction control unit 402 and increase the traction torque to help slow down, stop the roll back and reverse the bicycle motion forward. If the traction compensator 506 or the traction assistance is enabled, it will further assist to bring the roll back motion to stop and reverse the motion forward quicker or eliminate any roll back motion altogether.

Alternatively, the rider can press down the electric brake handle 108 at standstill, which activates the actuator brake 106 and holds the chainless electric bicycle 100 at standstill while the rider applies the pedal torque. As the pedal speed increases, the resistance torque will become larger, and the rider will have to increase the pedal torque to keep the pedals 107, 114 going. This process builds up the feedforward torque, and as a result the traction torque. The rider then releases the electric brake handle 108 slowly to determine if there is enough traction torque to overcome the traction resistance torque and prevent the roll back and move the chainless electric bicycle 100 forward. If that is not the case, the rider can press the electric brake handle 108 down and increase the pedal torque and repeat the process to move the chainless electric bicycle 100 forward. This same process can be performed with the mechanical brake system as well.

Any time the roll back happens in the incline startup, with the pedal speed positive and the brake is not applied, the motor 102 is in a reverse regenerative braking. The operation can continue only if the amount of power flowing into the DC bus 202 is absorbable by the DC bus 202 and the battery 103 (battery charging). If the battery charging is not possible, the traction charge protection signal $C_{PT}$ and the pedal charge protection signal $C_{PP}$ will become zero and cutting off power to the motor 102 and not allowing power flow from the generator 101 to the DC bus 202. In this case, the rider will have to use the brake to come to a stop. Since the roll back condition can be variety of cases, the activation of the charge protection signals ($C_{PT}$ and $C_{PP}$ transitioning to zero from one) can be in unpredictable scenarios. Therefore, the reverse regenerative roll back is only allowed up to a negative speed threshold. For the traction speed below the negative speed threshold, the traction torque is cut off, which is implemented with the zero-to-one block 620 in FIG. 6B and the operation of the zero-to-one block 620 is detailed in FIG. 12.

In the decline startup, if the rider gets on the chainless electric bicycle 100 and there is no braking, the chainless electric bicycle 100 will roll forward just as in the chain bicycle. If the pedal speed is zero or well below the pedal referred traction speed, no resistance torque will be generated. Hence, no feedforward torque is transmitted to the traction control unit 402 and no traction torque is applied to the motor 102 to propel it forward. In this case, only the gravity is pulling the chainless electric bicycle 100 forward. For any resistance torque to be generated and any traction torque to be applied to further accelerate the chainless electric bicycle 100, the pedal speed will need to synchronize with the traction speed just as in the chain bicycle.

Cruising

In the context of the present invention, the cruising is the case when the chainless electric bicycle 100 is accelerating or going at a steady speed. While accelerating, the pedal speed is higher than the pedal referred traction speed in a significant amount. In other words, the pedal speed and the traction speed are not synchronized. The pedal control unit 401 is generating resistance torque, as a result, there is a power flow from the generator 101 to the DC bus 202, and a positive feedforward torque is generated for the traction control unit 402, which causes a positive traction torque to be applied to the motor 102, hence, the chainless electric bicycle 100 accelerates. Once the pedal speed and the traction speed are synchronized, the resistance torque will continue to persist in a smaller amount on the pedals 107, 114, and will continue to draw power from the generator 101 and will continue to propel the chainless electric bicycle 100 forward as in the chain bicycle.

Coasting

In the context of the present invention, the coasting is when the traction torque is dropping to zero or it is zero and while there is a positive traction speed, in other words, the chainless electric bicycle 100 is moving forward. If the pedal referred traction speed overshoots pedal speed above a speed threshold, which could be a percentage of the pedal speed outside of the normal control limits, similar to the chain bicycle due to the ratchet action, to gain the control of the chainless electric bicycle 100, the resistance torque is dropped down to zero with the help of the one-to-zero block 603 in FIG. 6A, which results in zero power flow from the generator 101, zero feedforward torque to the traction control unit 402 and zero traction torque to the motor 102 allowing the chainless electric bicycle 100 to coast and slow down. If the chainless electric bicycle 100 is in the decline, the braking is needed to slow down the chainless electric bicycle 100 or bring it to a stop. The type of brake used can be regenerative braking, actuator braking or both depending on the operating parameters that have been described in foregoing embodiments.

Reverse Pedaling

In the reverse pedaling, independent of any operating condition, the resistance torque is zero, which results in zero power flow from the generator 101, zero feedforward torque to the traction control unit 402 and zero traction torque to the motor 102.

Brake Mode

The brake is initiated by the two brake handles 108, 113 provided on the chainless electric bicycle 100. In this embodiment, the electric brake handle 108 is used to apply brake on the rear wheel with the electric brake system, and the mechanical brake handle 113 is used to apply brake on the front wheel with the mechanical brake system. The electric brake system operation combining the actuator brake 106 and the regenerative brake is seamless to the rider, which has been discussed in detail in foregoing embodiments.

Moving Without Riding

In the operating case moving the chainless electric bicycle 100 without riding by hands or other means is going to be similar to the chain bicycle, easy and without any resistance from the traction wheel. Because, during this process, the pedal speed is zero and/or the pedal referred traction speed is higher than the pedal speed, which results in zero power flow from the generator 101, zero feedforward torque to the traction control unit 402 and zero traction torque to the motor 102.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A chainless electric bicycle comprising:
    at least one generator, which is mechanically coupled to a pair of pedals, configured to convert mechanical power from the pair of pedals to electrical AC power and to generate a resistance torque in response to a pedal torque;
    at least one active rectifier, which is coupled to the at least one generator, is configured to apply AC voltage to the at least one generator,
    wherein power flow can be in both directions in between the at least one active rectifier and the at least one generator,
    wherein the at least one active rectifier can be a passive rectifier by not applying AC voltage to the at least one generator;
    at least one motor, which is mounted in at least one wheel of the chainless electric bicycle, is configured to propel the at least one wheel and/or provide regenerative braking;
    at least one inverter, which is coupled to the at least one motor, wherein the at least one inverter is configured to apply AC voltage to the at least one motor;
    at least one battery, which is rechargeable and is configured with a charging-discharging control circuit, wherein the battery is connected to a DC bus via the charging-discharging circuit, wherein the battery is configured to provide DC power to the DC bus and to store energy received from the DC bus and/or an outlet, wherein the DC bus distributes power to the at least one active rectifier, the at least one inverter and circuits of the chainless electric bicycle;
    a pedal control unit, which is configured to control the resistance torque applied to the at least one generator by sending an active rectifier AC voltage command to the at least one active rectifier;
    a traction control unit, which is configured to control a traction torque and a traction speed by sending an inverter AC voltage command to the at least one inverter; and
    at least one control electronics, which is configured to run the pedal control unit and the traction control unit, wherein the at least one control electronics is configured for operating, controlling, measuring, monitoring, calculating, and estimating functions of the chainless electric bicycle.

2. The chainless electric bicycle of claim 1, wherein the pedal control unit further comprising:
    a resistance torque generator module, which is configured to compute a model resistance torque and a gravity compensator torque both based on a bicycle model;
    a resistance compensator module, which is configured to compute a resistance compensator torque and coupled to a resistance torque summation block, wherein the resistance compensator torque makes up for the model imperfections of the resistance torque generator module and assists to maintain a set gear ratio in between the pedal control unit and the traction control unit;
    the resistance torque summation block, which sums up the resistance compensator torque and the model resistance torque to obtain a first resistance torque command;
    a pedal torque multiplier, which multiplies the first resistance torque command with output of a one-to-zero block, a brake signal $B_{rk}$ and with a pedal charge protection signal $C_{PP}$, thereby computes a second resistance torque command, wherein the one-to-zero block receives a speed difference,
    wherein if the speed difference is above a first speed threshold, output of the one-to-zero block decreases down to zero from one, thereby not allowing resistance on the pair of pedals,
    wherein the speed difference is determined by subtracting a limited pedal speed from a pedal referred traction speed,
    wherein if the speed difference is below the first speed threshold, output of the one-to-zero block stays at one, thereby allowing the first resistance torque command to pass through,
    wherein the pedal charge protection signal is one if the battery is chargeable, and the pedal charge protection signal is zero if the battery is not chargeable;
    a pedal absolute torque limiter, which calculates a resistance torque command $T_{Gr}$ based on the second resistance torque command it receives;
    a generator torque controller, which receives the resistance torque command, computes the active rectifier AC voltage command $V_{Gr\_ABC}$ based on measured current $I_{G\_ABC}$ of the at least one generator and applies the voltage command to the at least one active rectifier by means of a voltage modulation technique to control the resistance torque; and
    an observer module, which is configured to generate a feedforward torque to the traction control unit based on the resistance torque command, a pedal speed, the gravity compensator torque and a measured pedal torque.

3. The chainless electric bicycle of claim 2, wherein the resistance compensator module further comprising:
    an absolute speed limiter block, which is configured to receive the pedal speed $\omega_P$ and compute the limited pedal speed $\omega_{PL}$;

a resistance controller, which is configured to receive a pedal speed error and compute a resistance controller torque, wherein the speed error is determined by subtracting the pedal referred traction speed from the limited pedal speed; and a resistance controller limiter, which is configured to receive the resistance controller torque and compute the resistance compensator torque $T_{RC}$ on output of the resistance controller limiter, wherein output of the resistance controller can range from negative values to positive values, hence a resistance controller positive limit and a resistance controller negative limit are used by the resistance controller limiter to limit the resistance compensator torque, wherein the resistance controller positive limit is determined by multiplying the model resistance torque or the limited pedal speed by a gain $K_{Gp}$ and summing with a pedal positive offset, wherein $K_{Gp}$ is above zero, wherein the resistance controller negative limit is determined by multiplying the model resistance torque by a gain $K_{Gn}$ and summing with a pedal negative offset, wherein the gain $K_{Gn}$ is below, wherein the resistance controller limiter for any values in between the resistance controller positive limit and the resistance controller negative limit passes the resistance controller torque to output of the resistance controller limiter, wherein $K_{Gp}$, $K_{Gn}$, the pedal positive offset and the pedal negative offset are fixed or dynamically adjustable.

4. The chainless electric bicycle of claim 2, wherein the resistance torque generator module further comprising:

an inertia resistance torque, wherein a first inertia torque is calculated as in the following:

$$T_{J1} = (G_R^2 J_B - J_P)\frac{d\omega_{PL}}{dt}$$

wherein $G_R$ is the gear ratio, $J_B$ is the rotational equivalent bicycle inertia, $J_P$ is the pedal assembly inertia, wherein the first inertia torque is coupled to a low pass filter, wherein the low pass filter computes a second inertia torque, wherein the second inertia torque is coupled to a first absolute torque limiter, wherein the first absolute torque limiter computes the inertia resistance torque;

a rolling resistance torque, which is calculated as in the following:

$$T_{RP}=(G_R^2 B_B \cos\theta - B_P)\omega_{PL}$$

wherein $B_B$ is the bicycle rolling torque (viscus friction) coefficient, $B_P$ is the pedal rolling torque coefficient, and $\theta$ is the incline angle, wherein a positive incline angle indicates the front of the chainless electric bicycle is pointing up;

a drag resistance torque, which is calculated as in the following:

$$T_{DP}=G_R^3 K_D \omega_{PL}^2$$

wherein $K_D$ is the drag torque coefficient;

a stiction resistance torque, which is calculated as in the following:

$$T_{SP} = G_R K_{ST} e^{\frac{-G_R \omega_{PL}}{\sigma_T}} - K_{SP} e^{\frac{-\omega_{PL}}{\sigma_P}}$$

wherein $K_{ST}$ is the traction stiction torque coefficient, $\sigma_T$ is the traction stiction torque decay coefficient, $K_{SP}$ is the pedal assembly stiction torque coefficient, and $\sigma_P$ is the pedal stiction torque decay coefficient;

a coulomb resistance torque, which is a constant torque independent of the pedal speed, which is calculated as in the following:

$$T_{CP}=G_R K_{CT} - K_{CP}$$

wherein $K_{CT}$ is the traction coulomb resistance torque, and $K_{CP}$ is the pedal assembly coulomb resistance torque;

a gravity resistance torque, wherein a first gravity torque is calculated as in the following:

$$T_{HP1}=G_R K_H \sin\theta$$

wherein $T_{HP1}$ is the first gravity torque, and $K_H$ is the gravity torque coefficient, wherein the first gravity torque is coupled to a second absolute torque limiter, wherein the second absolute torque limiter computes a second gravity torque $T_{HP2}$, wherein the second absolute torque limiter is coupled to a switch, wherein output of the switch determines the gravity resistance torque $T_{HP}$, wherein if the switch is in position 2, the second gravity torque $T_{HP2}$ passes through the switch and equates to the gravity resistance torque $T_{HP}$, wherein if the switch is in position 1, the gravity resistance torque becomes zero;

a gravity summation block, which calculates a first gravity compensator torque by subtracting the gravity resistance torque $T_{HP}$ from the second gravity torque $T_{HP2}$, wherein if the switch is in position 2, the first gravity compensator torque $T_{HC1}$ becomes zero, wherein if the switch is in position 1, the second gravity torque $T_{HP2}$ equates to the first gravity compensator torque $T_{HC1}$;

a zero-to-one block, which receives the limited pedal speed and computes value in range of zero to one, wherein if the limited pedal speed is more than a second speed threshold, output of the zero-to-one block is set to one, wherein if the limited pedal speed is less than zero, output of the zero-to-one block is set to zero, wherein if the limited pedal speed is less than the second speed threshold but more than zero, output is function of the limited pedal speed and is in between zero and one, wherein output of the zero-to-one block can be linear or non-linear function of the limited pedal speed;

a gravity compensator multiplier block, which multiplies output of the zero-to-one block and the first gravity compensator torque $T_{HC1}$ to obtain the gravity compensator torque $T_{HC}$;

a model torque summation block, which sums the inertia resistance torque, the rolling resistance torque, the drag resistance torque, the stiction resistance torque, the coulomb resistance torque, and the gravity resistance torque to obtain a first model resistance torque $T_{M1}$, wherein if the switch is in position 2, the gravity resistance torque is added to the model resistance torque calculation, thereby a rider feels the gravity resistance torque, wherein if the switch is in position 1, the gravity resistance torque becomes zero and the rider do not feel the gravity resistance torque; and a model torque multiplier, which multiplies output of the zero-to-one block and the first model resistance torque $T_{M1}$ to obtain the model resistance torque $T_M$, wherein multiplication provides smooth transition for the model resistance torque from zero pedal speed to non-zero pedal speed and from non-zero pedal speed to zero pedal speed.

5. The chainless electric bicycle of claim 2, wherein the observer module further comprising:
   an observer block, wherein the observer block comprising:
      a first summation block, which calculates an observer speed error by subtracting an estimated pedal speed from the pedal speed, wherein the observer speed error is multiplied by a first gain to obtain a first input signal, wherein the observer speed error is multiplied by a second gain to obtain a second input signal,
      a first integrator, which receives the second input signal and computes an estimated pedal torque,
      a second summation block, which subtracts the resistance torque command from the estimated pedal torque to find a torque difference, wherein the torque difference is divided by a pedal assembly inertia to calculate a third input signal,
      an estimated speed scaler, which is a gain as in $$\frac{-B_P}{J_P},$$

multiplies the gain with the estimated pedal speed to calculate a fourth input signal, wherein $J_P$ is the pedal assembly inertia and $B_P$ is the pedal rolling torque coefficient,
      a third summation block, which sums the first input signal, the third input signal, and the fourth input signal to calculate a second integrator input signal, and
      a second integrator, which integrates the second integrator input signal to obtain the estimated pedal speed;
   a signal inverter, which receives a pedal torque sensor enable signal $E_{TS}$ and outputs an inverted torque sensor enable signal, wherein $E_{TS}$ can be one or zero, wherein if $E_{TS}$ is one, the inverted torque sensor enable signal is zero, wherein if $E_{TS}$ is zero, the inverted torque sensor enable signal is one;
   a first observer multiplier, which multiplies the estimated pedal torque with the inverted torque sensor enable signal to obtain a first observer torque;
   a second observer multiplier, which multiplies the measured pedal torque with the pedal torque sensor enable signal $E_{TS}$ to obtain a second observer torque;
   a fourth summation block, which sums the first observer torque and the second observer torque to generate a third observer torque;
   an observer absolute torque limiter, which receives the third observer torque and outputs a first feedforward torque, wherein the observer absolute torque limiter limits the first feedforward torque to a maximum observer torque and zero; and
   a fifth summation block, which sums the first feedforward torque and the gravity compensation torque to obtain the feedforward torque for the traction control unit.

6. The chainless electric bicycle of claim 1, wherein the traction control unit further comprising:
   a scaler block, which receives the feedforward torque and multiplies the feedforward torque with a gain to obtain a first traction torque command,
   wherein the gain is the ratio of a torque assist gain $K_P$ divided by the gear ratio $G_R$,
   wherein both the torque assist gain and the gear ratio are adjustable,
   wherein since the feedforward torque is calculated by the pedal control unit, the gear ratio is used to adjust the feedforward torque for the at least one motor,
   wherein if $K_P$ is above one, a torque assistance feature is activated, and if the torque assistance feature is activated, the feature reduces the pedal torque required to achieve a specific traction speed compared to when $K_P$ was one at the specific traction speed, thereby easing the pedaling effort required by the rider,
   wherein if $K_P$ is below one, a ride charge feature is activated, and when the ride charge feature is activated, the feature increases the pedal torque required to achieve the specific traction speed compared to when $K_P$ was one at the specific traction speed, thereby increasing the pedaling effort required by the rider;
   a traction torque compensator, which receives the limited pedal speed, the traction speed, a traction compensator enable signal and the first traction torque command, and computes a traction compensator torque;
   a traction summation block, which sums the first traction torque command and the traction compensator torque, and outputs a second traction torque command;
   a traction absolute torque limiter, which receives the second traction torque command and outputs a third traction torque command;
   a first traction torque multiplier, which multiplies the third traction torque command with a brake signal $B_{rk}$ and with output of a traction zero-to-one block and outputs a fourth traction torque command,
   wherein the brake signal is set to zero to prevent a traction torque command to become positive when there is braking, wherein input of the traction zero-to-one block is the traction speed and if the traction speed is below a negative speed threshold, output of the traction zero-to-one block drops to zero linearly or non-linearly as function of the traction speed,
   wherein if the traction speed is equal and above the negative speed threshold, output of the traction zero-to-one block is one;
   a traction command summation block, which sums the fourth traction torque command with a regenerative brake torque command $T_{Brk}$ and outputs a fifth traction torque command,
   wherein the regenerative brake torque command can only be non-zero when the brake signal $B_{rk}$ is zero;
   a second traction torque multiplier, which multiplies the fifth traction torque command with a traction charge protection signal $C_{PT}$, and outputs the traction torque command,
   wherein the traction charge protection signal is zero when the battery is not chargeable and the DC bus cannot accept more energy, thereby preventing any regenerative operation by the at least one motor, wherein the traction charge protection signal is one when the battery is chargeable and the DC bus can accept energy; and
   a motor torque controller, which receives the traction torque command, computes the inverter AC voltage command $V_{Tr\_ABC}$ based on measured current $I_{T\_ABC}$ of the at least one motor and applies the voltage command to the at least one inverter by means of a voltage modulation technique to control the traction torque.

7. The chainless electric bicycle of claim 6, wherein the traction torque compensator further comprising:
   a traction controller, which receives a traction speed error, wherein the speed error is obtained by subtracting the traction speed from a traction referred pedal speed, wherein the traction controller computes a traction controller torque;
a traction controller limiter, which receives the traction controller torque and computes a first traction compensator torque on output of the traction controller limiter,
wherein the traction controller torque can range from negative values to positive values, hence a traction controller positive limit and a traction controller negative limit are used by the traction torque limiter to limit the first traction compensator torque,
wherein the traction controller positive limit is determined by multiplying the first traction torque command by a gain $K_{Tp}$ and summing with a traction positive offset, wherein the gain $K_{Tp}$ is above zero,
wherein the traction controller negative limit is determined by multiplying the first traction torque command by a gain $K_{Tn}$ and summing with a traction negative offset,
wherein the gain $K_{Tn}$ is below zero,
wherein $K_{Tp}$, $K_{Tn}$, the traction positive offset and the traction negative offset are fixed or dynamically adjustable,
wherein the traction torque limiter for any values in between the traction controller negative limit and the traction controller positive limit passes the traction controller torque to output of the traction torque limiter; and
a traction compensator enable multiplier, which multiplies the first traction compensator torque and the traction compensator enable signal $E_{TC}$, thereby computes the traction compensator torque $T_{TC}$,
wherein the traction compensator enable signal is one or zero,
wherein when the traction compensator enable signal is one, the traction torque compensator is active and contributing to the traction torque command generation, and when the traction torque compensator is active, the traction compensator torque is assisting the rider by actively reducing the resistance torque required to ride the chainless electric bicycle,
wherein as oppose to a constant or linear torque assist gain $K_P$ as introduced in the scaler block, the traction torque compensator is a closed loop controller, which is dynamic, thereby providing a different riding experience to the rider,
wherein when the traction compensator enable signal is zero, the traction torque compensator is inactive and not contributing to the second traction torque command generation.

8. The chainless electric bicycle of claim 1, further configured with at least one of a generator rotor position sensor and a motor rotor position sensor, wherein the generator rotor position sensor is coupled to the at least one generator and determines a generator rotor position of the at least one generator that is used in control of the resistance torque to the at least one generator and is also used for the pedal speed calculation, wherein the motor rotor position sensor is coupled to the at least one motor and determines a motor rotor position that is used in control of the traction torque to the at least one motor and is also used for the traction speed calculation.

9. The chainless electric bicycle of claim 1, further configured with an electronic gear shift knob, which is adapted to set the resistance level of the pair of pedals, wherein an electronic gear shift can be set to an automatic mode via a button or a user interface which will change the gear ratio in a continuously variable fashion as the traction speed changes.

10. The chainless electric bicycle of claim 1, further configured to have an electric brake system, wherein the braking is initiated by an electric brake handle,
wherein the electric brake handle generates an electric brake handle signal $S_{bh}$ proportional to the level the handle is pressed,
wherein the electric brake handle signal is received by a brake control unit, wherein the brake control unit converts the electric brake handle signal $S_{bh}$ to a regenerative brake torque command $T_{Brk}$ to the traction control unit or to an actuator brake current command $I_{ar}$ as an indicative of a brake force to an actuator, or to both the regenerative brake torque command $T_{Brk}$ and to the actuator brake current command $I_{ar}$ by partitioning the electric brake signal $S_{bh}$ based on the traction speed $\omega_T$, the rotational equivalent bicycle inertia $J_B$, a torque threshold $T_{th}$, a maximum torque $T_{max}$ allowed to the at least one motor, an execution period $\Delta t$ of the brake control unit, a regenerative speed threshold $\omega_{RGth}$, and the traction charge protection signal $C_{PT}$,
wherein if $\omega_T$ is equal or less than $\omega_{RGth}$, only the actuator brake current command $I_{ar}$ is applied, as calculated below:

$$I_{ar} = I_{a\_max} S_{bh} + \delta$$

wherein $I_{a\_max}$ is the maximum allowed current (correlating to the maximum force) to the actuator brake, $\delta$ is the offset current to prevent any backlash,
wherein if $\omega_T$ is greater than $\omega_{RGth}$, $C_{PT}$ is equal to one, and an available regenerative brake torque $T_{RG}$ is equal or greater than a reference regenerative brake torque $T_{RGr}$, only regenerative brake is applied as calculated below:

$$T_{RGr} = T_{max} S_{hb}$$

$$T_{RG} = \frac{1}{2} \frac{J_B}{\Delta t} \left( \omega_T - \frac{\omega_{RGth}^2}{\omega_T} \right)$$

$$T_{Brk} = -T_{RG}$$

wherein if $\omega_T$ is greater than $\omega_{RGth}$, $C_{PT}$ is equal to one, and if $T_{RG}$ is less than $T_{RGr}$, but more than $T_{th}$, both the regenerative brake torque command $T_{Brk}$ and the actuator brake current command $I_{ar}$ are applied as calculated below:

$$T_{Brk} = -T_{RG}$$

$$\Delta T_a = T_{RGr} - T_{RG}$$

$$I_{ar} = \frac{\Delta T_a}{T_{max}} I_{a\_max} + \delta$$

wherein $T_{RG}$ is equal or less than $T_{th}$, only the actuator brake is applied as $I_{ar}$ calculated earlier,
wherein if anytime $C_{PT}$ is equal to zero, meaning the traction charge protection signal is activated, only the actuator brake is applied,
wherein if the electric brake signal or a mechanical brake signal is non-zero and the traction speed $\omega_T$ is below a traction speed threshold $\omega_{T\_th}$, the brake signal $B_{rk}$ is set to one,
wherein the mechanical brake signal $S_{bhm}$ belongs to the mechanical brake system and only used for brake status of the brake system,
wherein if the mechanical brake system is not present, $S_{bhm}$ equals to zero all the time, wherein if the electric brake signal or the mechanical brake signal is positive, and $\omega_T$ is equal or above $\omega_{T\_th}$, $B_{rk}$ is set to zero, wherein allowing $B_{rk}$ to be one in low speed, allows the traction torque to be present during braking, thereby allowing easier incline start from zero speed, wherein $\omega_{T\_th}$ is always less than $\omega_{RGth}$.

11. The chainless electric bicycle of claim 1, further comprising:
- a main power button to connect and disconnect the battery to circuits of the chainless electric bicycle;
- a vibration sensor to detect presence and non-presence of the rider on and near the chainless electric bicycle by measuring and monitoring a displacement of the chainless electric bicycle;
- touch sensors provided on the handlebars, which are adapted to detect presence and non-presence of the rider on and near the chainless electric bicycle;
- a weight sensor under a rider seat to measure the weight of the rider and as a result to calculate the rotational equivalent bicycle inertia, the rolling resistance coefficient, the gravity torque coefficient, the drag torque coefficient, and other bicycle model related parameters;
- three DC power switches on the DC bus for safety during operation and for the power connect/disconnect from the battery, wherein one of the switches is placed in between the at least one active rectifier and the battery, one of the switches is placed in between the at least one inverter and the battery, and one of the switches is placed in between the battery and the DC bus;
- a pedal torque sensor placed into a pedal assembly, wherein the pedal torque sensor measures the pedal torque and obtains a measured pedal torque, thereby, eliminating the need for the estimated pedal torque and using the measured pedal torque as part of the feedforward torque calculation; and
- at least one user interface unit adapted to perform and display various monitoring, estimation, calculation and configuration functions for the chainless electric bicycle, wherein the performed functions can be the bicycle speed, the gear ratio, a distance traveled, an automatic/manual gear ratio setting, charge status of the battery, power of the at least one motor, power of the at least one generator, faults, temperatures.

12. A method of controlling a chainless electric bicycle, the method comprising steps of:
- generating an active rectifier AC voltage command for an active rectifier based on a resistance torque command by a pedal control unit to control a resistance torque to a generator and generating a feedforward torque by the pedal control unit to control a traction speed and/or a traction torque, wherein the generator is mechanically coupled to a pair of pedals, configured to convert mechanical power from the pair of pedals to electrical AC power and to generate the resistance torque in response to a pedal torque; and
- generating an inverter AC voltage command for an inverter based on a traction torque command by a traction control unit to control the traction torque of a motor and/or the traction speed of the motor, wherein the motor is mounted in at least one wheel of the chainless electric bicycle, which is configured to propel the at least one wheel of the chainless electric bicycle, wherein the traction torque command is computed by the traction control unit based on the feedforward torque, wherein a battery is configured to provide DC power to a DC bus and to store energy received from the DC bus and/or an outlet, wherein the battery, the inverter and the active rectifier are connected to the DC bus, wherein the DC bus distributes power to the active rectifier, the inverter and circuits of the chainless electric bicycle.

13. The method of claim 12, wherein generating the active rectifier AC voltage command by the pedal control unit, further comprises steps of:
- generating a model resistance torque based on a bicycle model;
- generating a resistance compensator torque, which makes up for the imperfections in the bicycle model and allows to maintain a set gear ratio in between the pedal speed and the traction speed;
- summing the model resistance torque and the resistance compensator torque to obtain a first resistance torque command;
- multiplying the first resistance torque command with output of a one-to-zero block, a brake signal $B_{rk}$ and a pedal charge protection signal $C_{PP}$ to obtain a second resistance torque command, wherein input of the one-to-zero block is a speed difference, wherein a limited pedal speed is subtracted from a pedal referred traction speed to calculate the speed difference;
- generating the resistance torque command on output of a pedal absolute torque limiter by applying the second resistance torque command to input of the pedal absolute torque limiter; and
- generating the active rectifier AC voltage command $V_{Gr\_ABC}$ to the active rectifier to control the resistance torque of the generator to the resistance torque command $T_{Gr}$, wherein the resistance torque command is regulated by a generator torque controller based on measured current $I_{G\_ABC}$ of the generator, wherein the generator torque controller applies the active rectifier AC voltage command to the active rectifier by means of a voltage modulation technique to control the resistance torque.

14. The method of claim 13, wherein generating the model resistance torque, further comprises steps of:
- determining an inertia resistance torque by calculating a first inertia torque as in the following equation:

$$T_{J1} = (G_R^2 J_B - J_P)\frac{d\omega_{PL}}{dt}$$

wherein $G_R$ is a gear ratio, $J_B$ is a rotational equivalent of the bicycle inertia, $J_P$ is the pedal assembly inertia, $\omega_{PL}$ is the limited pedal speed, which is obtained from an absolute speed limiter, calculating a second inertia torque by applying a low pass filter to the first inertia torque, and applying the second inertia torque to a first absolute torque limiter;

determining a rolling resistance torque by using the following equation:

$$T_{RP} = (G_R^2 B_B \cos\theta - B_P)\omega_{PL}$$

wherein $B_B$ is a bicycle rolling torque (viscus friction) coefficient, $B_P$ is a pedal rolling torque coefficient, and $\theta$ is an incline angle, wherein a positive incline angle indicates the chainless electric bicycle is pointing up in an incline;

determining a drag resistance torque by using the following equation:

$$T_{DP} = G_R^3 K_D \omega_{PL}^2$$

wherein $K_D$ is a drag torque coefficient;
determining a stiction resistance torque by using the following equation:

$$T_{SP} = G_R K_{ST} e^{\frac{-G_R \omega_{PL}}{\sigma_T}} - K_{SP} e^{\frac{-\omega_{PL}}{\sigma_P}}$$

wherein $K_{ST}$ is a traction stiction torque coefficient, $\sigma_T$ is a traction stiction torque decay coefficient, $K_{SP}$ is a pedal assembly stiction torque coefficient, and $\sigma_P$ is a pedal stiction torque decay coefficient;
determining a coulomb resistance torque by using the following equation:

$$T_{CP} = G_R K_{CT} - K_{CP}$$

wherein $K_{CT}$ is a traction coulomb resistance torque, and $K_{CP}$ is a pedal assembly coulomb resistance torque;
determining a gravity resistance torque by calculating a first gravity torque by the following equation:

$$T_{HP1} = G_R K_H \sin \theta$$

wherein $K_H$ is a gravity torque coefficient,
calculating a second gravity torque by applying the first gravity torque to a second absolute torque limiter, and
applying the second gravity torque to a switch, wherein the output of the switch is the gravity resistance torque, and if the switch is in position 1, output of the switch becomes zero, and if the switch is in position 2, the second gravity torque becomes available on output of the switch output, hence the second gravity torque becomes the gravity resistance torque $T_{HP}$;
calculating a first model resistance torque by summing the inertia resistance torque, the rolling resistance torque, the drag resistance torque, the stiction resistance torque, the coulomb resistance torque, and the gravity resistance torque;
generating a zero-to-one signal by using a zero-to-one block, wherein the input is the limited pedal speed;
multiplying the zero-to-one signal with the first model resistance torque to obtain the model resistance torque;
calculating a first gravity compensator torque by subtracting the output of the switch from the second gravity torque, and if the switch is in position 1, the first gravity compensator torque becomes equal to the second gravity torque, and if the switch is in position 2, the first gravity compensator torque becomes equal to zero; and
multiplying the zero-to-one signal with the first gravity compensator torque to obtain a gravity compensator torque.

15. The method of claim 13, wherein generating the resistance compensator torque, further comprises steps of:
generating a resistance controller torque by a resistance controller based on a speed error input, wherein the speed error is calculated by subtracting the pedal referred traction speed from the limited pedal speed; and
generating the resistance compensator torque by a resistance controller limiter, wherein the resistance controller limiter limits the resistance controller torque to a resistance controller positive limit and a resistance controller negative limit, wherein the resistance controller limiter passes through the resistance controller torque to output of the resistance controller limiter if the resistance controller torque is in between the resistance controller positive limit and the resistance controller negative limit,
wherein the resistance controller positive limit is calculated by multiplying the model resistance torque or the limited pedal speed with a gain $K_{Gp}$ and summing with a pedal positive offset, wherein $K_{Gp}$ is above zero,
wherein the resistance controller negative limit is calculated by multiplying the model resistance torque with a gain $K_{Gn}$ and summing with a pedal negative offset, wherein $K_{Gn}$ is below zero,
wherein $K_{Gp}$, $K_{Gn}$, the pedal positive offset and the pedal negative offset are fixed or dynamically adjustable.

16. The method of claim 12, wherein generating the inverter AC voltage command by the traction control unit, further comprises steps of:
generating the feedforward torque by summing a first feedforward torque and the gravity compensator torque;
generating a first traction torque command by multiplying the feedforward torque with $$\frac{K_P}{G_R},$$

wherein $K_P$ is the torque assist gain,
wherein if $K_P$ is above one, a torque assistance feature is activated, and if the torque assistance feature is activated, the feature reduces the pedal torque required to achieve a specific traction speed compared to when $K_P$ was one at the specific traction speed, thereby easing the pedaling effort required by a rider,
wherein if $K_P$ is below one, a ride charge feature is activated, and when the ride charge feature is activated, the feature increases the pedal torque required to achieve the specific traction speed compared to when $K_P$ was one at the specific traction speed, thereby increasing the pedal torque required from the rider;
generating a traction compensator torque based on a traction speed error, wherein the traction compensator torque is adjusted dynamically, wherein the traction compensator torque is summed with the first traction torque command to calculate a second traction torque command;
generating a third traction torque command on output of a traction absolute torque limiter by applying the second traction torque command to input of the traction absolute torque limiter;
generating a fourth traction torque command by multiplying output of a traction zero-to-one block and a brake signal $B_{rk}$ with the third traction torque command, wherein input of the traction zero-to-one block is the traction speed,
wherein if the traction speed drops below a negative speed threshold, output of the traction zero-to-one block transitions to zero from one,
wherein output of the traction zero-to-one block transition can be linear or non-linear;
generating a fifth traction torque command by summing the fourth traction torque command with a regenerative brake torque command $T_{Brk}$;
generating the traction torque command by multiplying the fifth traction torque command with a traction charge protection signal $C_{PT}$, wherein the charge protection signal is zero if the battery and the DC bus is not chargeable and the charge protection signal is one if the battery and the DC bus is chargeable; and generating the inverter AC voltage command $V_{Tr\_ABC}$ to control the traction torque of the motor to the traction torque command $T_{Tr}$, wherein the traction torque command is regulated by a motor torque controller based on measured current $I_{T\_ABC}$ of the motor, wherein the traction controller applies the voltage command to the inverter by means of a voltage modulation technique to control the traction torque.

17. The method of claim 16, wherein generating the traction compensator torque, further comprises steps of:

generating a traction controller torque by the traction controller based on the traction speed error, wherein the traction speed error is calculated by subtracting the traction speed from a traction referred limited pedal speed;

generating a first traction compensator torque by a traction controller limiter, wherein the traction controller limiter limits the first traction compensator torque to a traction controller positive limit and a traction controller negative limit, wherein the traction controller limiter passes through the traction controller torque to output of the traction controller limiter if the traction controller torque is in between the traction controller positive limit and the traction controller negative limit, wherein the traction controller positive limit is calculated by multiplying the first traction compensator torque or the traction referred limited pedal speed with a gain $K_{Tp}$ and summing with a traction positive offset, wherein $K_{Tp}$ is above zero, wherein the traction controller negative limit is calculated by multiplying the first traction compensator torque with a gain $K_{Tn}$ and summing with a traction negative offset, wherein $K_{Tn}$ is below zero, wherein $K_{Tp}$, $K_{Tn}$, the traction positive offset and the traction negative offset are fixed or dynamically adjustable;

multiplying the first traction compensator torque by a traction compensator enable signal $E_{TC}$ to calculate the traction compensator torque, wherein the traction compensator enable signal is one or zero, wherein if the traction compensator enable signal is one, the traction torque compensator is active and contributing to the traction torque command generation, and if the traction torque compensator is active, the traction compensator torque is assisting the rider by actively reducing the resistance torque required to ride the chainless electric bicycle, wherein as oppose to a constant and linear torque assist gain $K_P$ as introduced in the torque assistance feature, the traction torque compensator is a closed loop controller, which is dynamic, thereby providing a different riding experience to the rider, wherein if the traction compensator enable signal is one, the torque assist gain $K_P$ is set to one to not interfere with the traction compensator torque, wherein when the traction compensator enable signal is zero, the traction torque compensator is inactive and not contributing to the second traction torque command generation.

18. The method of claim 16, wherein generating the first feedforward torque, further comprises steps of:

determining a first observer torque by
calculating an observer speed error by subtracting an estimated pedal speed from the pedal speed, multiplying the observer speed error by a first observer gain $L_1$ to obtain a first input signal, calculating an estimated pedal torque by integrating a first integrator input, wherein the first integrator input is obtained by multiplying the observer speed error by a second observer gain $L_2$, calculating a second input signal by subtracting the resistance torque command $T_{Gr}$ from the estimated pedal torque $T_{Pe}$ and dividing the result with a pedal assembly inertia $J_P$, calculating a third input signal by multiplying the estimated pedal speed $\omega_{Pe}$ by the negative of a pedal rolling torque coefficient—$B_P$ and dividing the result with the pedal assembly inertia $J_P$, calculating the estimated pedal speed by integrating the sum of the first input signal, the second input signal, and the third input signal, and calculating the first observer torque by multiplying the estimated pedal torque with an inverted torque sensor enable signal;

determining a second observer torque by multiplying a measured pedal torque $T_{GM}$ from a torque sensor with a torque sensor enable signal $E_{TS}$, wherein $E_{TS}$ is one for enabling the measured pedal torque and is zero for disabling the measured torque, wherein the inverted torque sensor enable signal is the logical inversion of $E_{TS}$;

determining a third observer torque by summing the first observer torque with the second observer torque; and determining the first feedforward torque by applying the third observer torque to an observer absolute torque limiter, wherein the observer absolute torque limiter limits the first feedforward torque to a maximum observer torque and zero.

19. The method of claim 12, wherein generating an actuator brake current command and/or a regenerative brake torque command based on an electric brake handle signal to control a brake force applied to the at least one wheel of the chainless electric bicycle, wherein the actuator brake current command and the regenerative brake torque command, further comprises steps of:

receiving the electric brake handle signal $S_{bh}$ to determine a first condition status of if $S_{bh}$ is above zero, wherein if the first condition status is true, determining a second condition status of if the traction speed $\omega_T$ is greater than a regenerative speed threshold $\omega_{RGth}$ and a traction charge protection status $C_{PT}$ is equal to one;

calculating the actuator brake current command $I_{ar}$ and the regenerative brake torque command $T_{Brk}$ if the second condition status is false as in the following:

$$I_{ar}=I_{a\_max}S_{bh}+\delta$$

$$T_{Brk}=0$$

wherein $I_{a\_max}$ is the maximum allowed current to an actuator brake, and $\delta$ is the offset current to prevent any backlash, wherein $I_{a\_max}$ is an indicative value of a maximum brake force of the actuator brake;

determining a third condition status if the second condition status is false, wherein the third condition status is if $\omega_T$ is less than a speed threshold $\omega_{T\_th}$, wherein $\omega_{RGth}$ is always greater than $\omega_{T\_th}$;

calculating a brake signal $B_{rk}$ value based on the third condition status, wherein if the third condition status is true, $B_{rk}$ is equal to one, which allows the traction torque to be applied at the same time as the brake force to ease the incline startup, wherein if the third condition status is false, $B_{rk}$ is equal to zero, which makes the traction torque command and the resistance torque command zero while braking;

calculating an available regenerative brake torque $T_{RG}$, a reference regenerative brake torque $T_{RGr}$, and the brake signal $B_{rk}$ value if the second condition status is true as in the following:

$$T_{RGr} = T_{max} S_{hb}$$

$$T_{RG} = \frac{1}{2} \frac{J_B}{\Delta t}\left(\omega_T - \frac{\omega_{RGth}^2}{\omega_T}\right)$$

$$B_{rk} = 0$$

wherein $\Delta t$ is the execution period of a brake control unit, $J_B$ is the rotational equivalent bicycle inertia, $\omega_T$ is the traction speed of the motor and $T_{max}$ is the maximum torque allowed to the motor, determining a fourth condition status if the second condition status is true, wherein the fourth condition status is if $T_{RG}$ is equal or greater than $T_{RGr}$;

calculating the actuator brake current command $I_{ar}$ and the regenerative brake torque command $T_{Brk}$ if the fourth condition status is true as in the following:

$$T_{Brk} = -T_{RG}$$

$$I_{ar} = 0$$

determining a fifth condition status if the fourth condition status is false, wherein the fifth condition status is if $T_{RG}$ is greater than a torque threshold $T_{th}$;

calculating the actuator brake current command $I_{ar}$ and the regenerative brake torque command $T_{Brk}$ if the fifth condition status is true as in the following:

$$T_{Brk} = -T_{RG}$$

$$\Delta T_a = T_{RGr} - T_{RG}$$

$$I_{ar} = \frac{\Delta T_a}{T_{max}} I_{a\_max} + \delta$$

calculating the actuator brake current command $I_{ar}$ and the regenerative brake torque command $T_{Brk}$ if the fifth condition status is false as in the following:

$$I_{ar} = I_{a\_max} S_{bh} + \delta$$

$$T_{Brk} = 0$$

calculating the regenerative brake torque command as $T_{Brk}=0$ if the first condition status is false;

determining a sixth condition status if the first condition status is false, wherein the sixth condition status is if a mechanical brake handle signal $S_{bhm}$ is above zero;

calculating the brake signal as $B_{rk}=1$ if the sixth condition status is false;

calculating the brake signal as $B_{rk}=0$ if the sixth condition status is true and the third condition status is false; and calculating the brake signal as $B_{rk}=1$ if the sixth condition status is true and the third condition status is true.

* * * * *